US008521954B2

(12) United States Patent
Nishikawa et al.

(10) Patent No.: US 8,521,954 B2
(45) Date of Patent: Aug. 27, 2013

(54) MANAGEMENT COMPUTER AND VOLUME CONFIGURATION MANAGEMENT METHOD

(75) Inventors: Norifumi Nishikawa, Machida (JP); Hirokazu Ikeda, Yamato (JP); Yuki Naganuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 12/999,999

(22) PCT Filed: Dec. 3, 2010

(86) PCT No.: PCT/JP2010/007064
§ 371 (c)(1),
(2), (4) Date: Dec. 17, 2010

(87) PCT Pub. No.: WO2012/073296
PCT Pub. Date: Jun. 7, 2012

(65) Prior Publication Data
US 2012/0144112 A1    Jun. 7, 2012

(51) Int. Cl.
*G06F 12/00* (2006.01)
(52) U.S. Cl.
USPC ........................................................ 711/114
(58) Field of Classification Search
None
See application file for complete search history.

(56) References Cited

U.S. PATENT DOCUMENTS

| 7,613,878 | B2 * | 11/2009 | Mori et al. ..................... 711/114 |
| 8,250,327 | B2 * | 8/2012 | Fujii et al. ..................... 711/165 |
| 2007/0192558 | A1 * | 8/2007 | Honda et al. .................. 711/165 |
| 2009/0049241 | A1 | 2/2009 | Ohno et al. |
| 2009/0144732 | A1 * | 6/2009 | Tanaka ............................... 718/1 |
| 2010/0287306 | A1 | 11/2010 | Matsuda |

FOREIGN PATENT DOCUMENTS

| JP | 2004-5370 | 1/2004 |
| WO | WO 2010/095176 A1 | 8/2010 |

OTHER PUBLICATIONS

PCT International Search Report and Written Opinion on application No. PCT/JP2010/007064 mailed Jul. 8, 2011; 11 pages.

* cited by examiner

*Primary Examiner* — Hiep Nguyen
(74) *Attorney, Agent, or Firm* — Foley & Lardner LLP

(57) ABSTRACT

The configuration of volumes provided by a plurality of storage apparatuses with an external connection function is optimized.

By associating a virtual volume provided to the host computer with a real volume of another storage apparatus other than their own, the plurality of storage apparatuses manage the real volume of the other storage apparatus as their own real volume, and a management computer comprises a detection unit which detects a correspondence relationship between the virtual volume of one storage apparatus among the plurality of storage apparatuses and the real volume of the one storage apparatus or of the other storage apparatus; and a modification unit which, if the real volume is added to any of the plurality of the storage apparatuses, modifies the correspondence relationship between the virtual volume and the real volume associated with the virtual volume, according to the correspondence relationship detected by the detection unit.

11 Claims, 29 Drawing Sheets

FIG.7

| APPARATUS NAME | V-Vol | CAPACITY | Tier | REAL VOL |
|---|---|---|---|---|
| S1 | 1 | 100G | 1 | S1:P-Vol1 |
| S1 | 2 | 500G | 2 | S4:V-Vol10, S4:P-Vol2 |
| S1 | 3 | 100G | 1 | S2:V-Vol6, S2: P-Vol3 |
| S1 | 4 | 500G | 2 | S2:V-Vol7, S5:V-Vol11, S5:P-Vol4 |
| S1 | 5 | 100G | 1 | S2:V-Vol8, S3:V-Vol9, S3: P-Vol5 |

| APPARATUS NAME | V-Vol | PERMISSIBLE LEVEL COUNT |
|---|---|---|
| S1 | 1 | 1 |
| S1 | 2 | 1 |
| S1 | 3 | 2 |
| S1 | 4 | 2 |
| S1 | 5 | 2 |

| Tier | PERMISSIBLE LEVEL COUNT |
|---|---|
| 1 | IN THE SAME APPARATUS |
| 2 | ONE LEVEL IN VERTICAL DIRECTION |

3500b 3511　3512

| APPARATUS NAME | P-Vol | CAPACITY | Tier | UNUSED CAPACITY |
|---|---|---|---|---|
| S1 | 1 | 100G | 1 | 0G |
| S4 | 2 | 500G | 2 | 300G |
| S2 | 3 | 100G | 1 | 50G |
| S5 | 4 | 500G | 2 | 400G |
| S3 | 5 | 100G | 1 | 100G |

| APPARATUS NAME | V-Vol | CAPACITY | Tier | REAL VOL |
|---|---|---|---|---|
| S1 | 1 | 100G | 1 | P-Vol1 |
| 3401 | 3402 | 3403 | 3404 | 3405 |

| APPARATUS NAME | V-Vol | CAPACITY | Tier | REAL VOL |
|---|---|---|---|---|
| S1 | 2 | 500G | 2 | S4:V-Vol10, S4:P-Vol2 |
| 3401 | 3402 | 3403 | 3404 | 3405 |

| APPARATUS NAME | V-Vol | CAPACITY | Tier | REAL VOL |
|---|---|---|---|---|
| S1 | 5 | 100G | 1 | S2:V-Vol8, S3:V-Vol9, S3:P-Vol5 |

| APPARATUS NAME | V-Vol | CAPACITY | Tier | REAL VOL |
|---|---|---|---|---|
| S1 | 4 | 500G | 2 | S2:V-Vol7, S5:V-Vol11, S5: P-Vol4 |

3401　3402　3403　3404　3405

3400

⇒

| APPARATUS NAME | V-Vol | CAPACITY | Tier | REAL VOL |
|---|---|---|---|---|
| S1 | 4 | 500G | 2 | S4:V-Vol12, S4: P-Vol8 |

| APPARATUS NAME | V-Vol | CAPACITY | Tier | LEVEL COUNT | REAL VOL |
|---|---|---|---|---|---|
| S1 | 1 | 100G | 1 | 1 | P-Vol1 |
| S1 | 2 | 500G | 2 | 2 | S4:V-Vol10 |
| S1 | 3 | 100G | 1 | 2 | S2:V-Vol6 |
| S1 | 4 | 500G | 2 | 3 | S2:V-Vol7 |
| S1 | 5 | 100G | 1 | 3 | S2:V-Vol8 |
| S2 | 6 | 100G | | 1 | P-Vol3 |
| S2 | 7 | 500G | | 2 | S5:V-Vol11 |
| S2 | 8 | 100G | | 2 | S3:V-Vol9 |
| S3 | 9 | 100G | | 1 | P-Vol5 |
| S4 | 10 | 500G | | 1 | P-Vol2 |
| S5 | 11 | 500G | | 1 | P-Vol4 |
| 4401 | 4402 | 4403 | 4404 | 4405 | 4406 |

Table 4400 (left):

| APPARATUS NAME | V-Vol | CAPACITY | Tier | LEVEL COUNT | REAL VOL |
|---|---|---|---|---|---|
| S2 | 8 | 100G | | 2 | S3:V-Vol9 |
| S3 | 9 | 100G | | 1 | P-Vol5 |

4401 · 4402 · 4403 · 4404 · 4405 · 4406

⇒

Table 4400 (right):

| APPARATUS NAME | V-Vol | CAPACITY | Tier | LEVEL COUNT | REAL VOL |
|---|---|---|---|---|---|
| S2 | 8 | 100G | | 2 | S3:V-Vol9 |
| S3 | 9 | 100G | | 1 | P-Vol5 |
| S1 | 5 | 100G | 1 | 3 | S2:V-Vol8 |

4401 · 4402 · 4403 · 4404 · 4405 · 4406

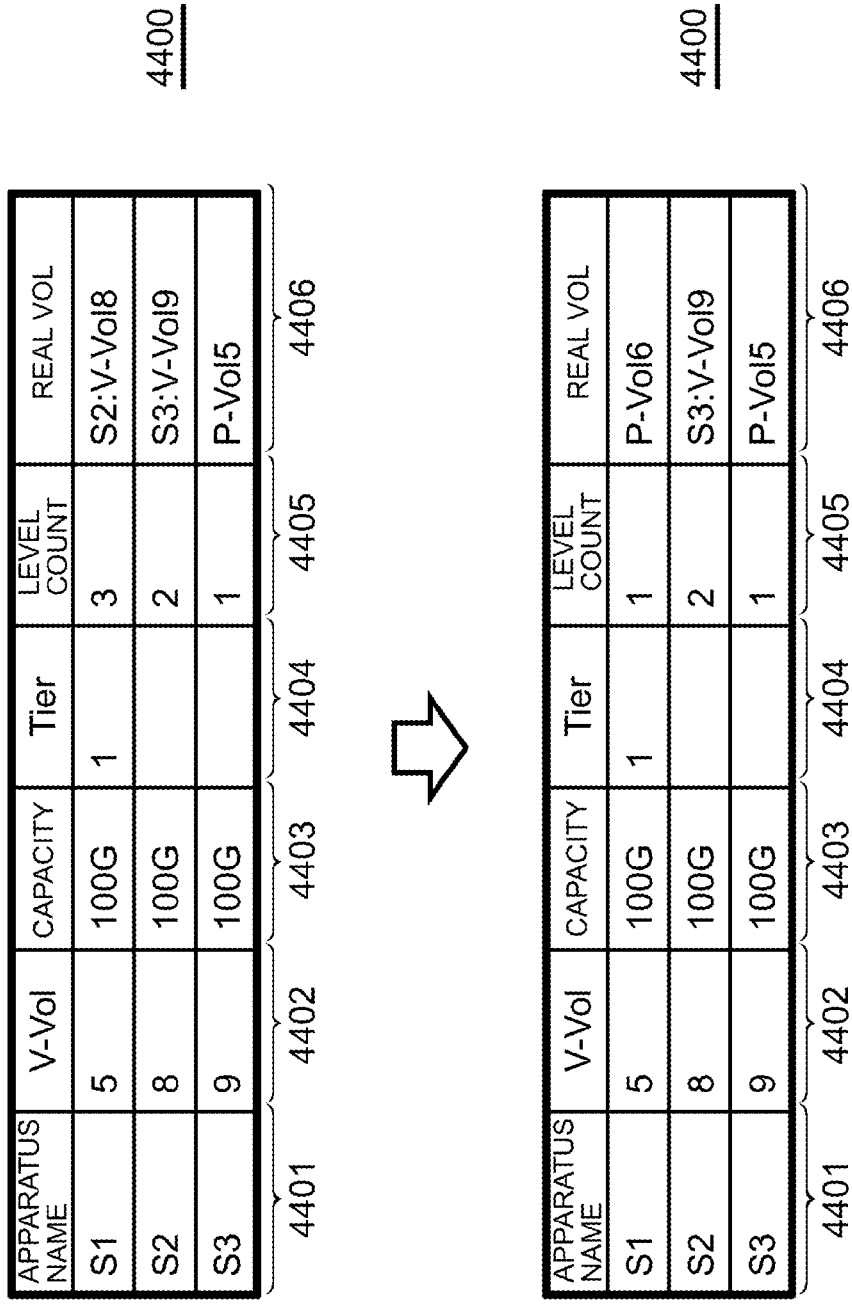

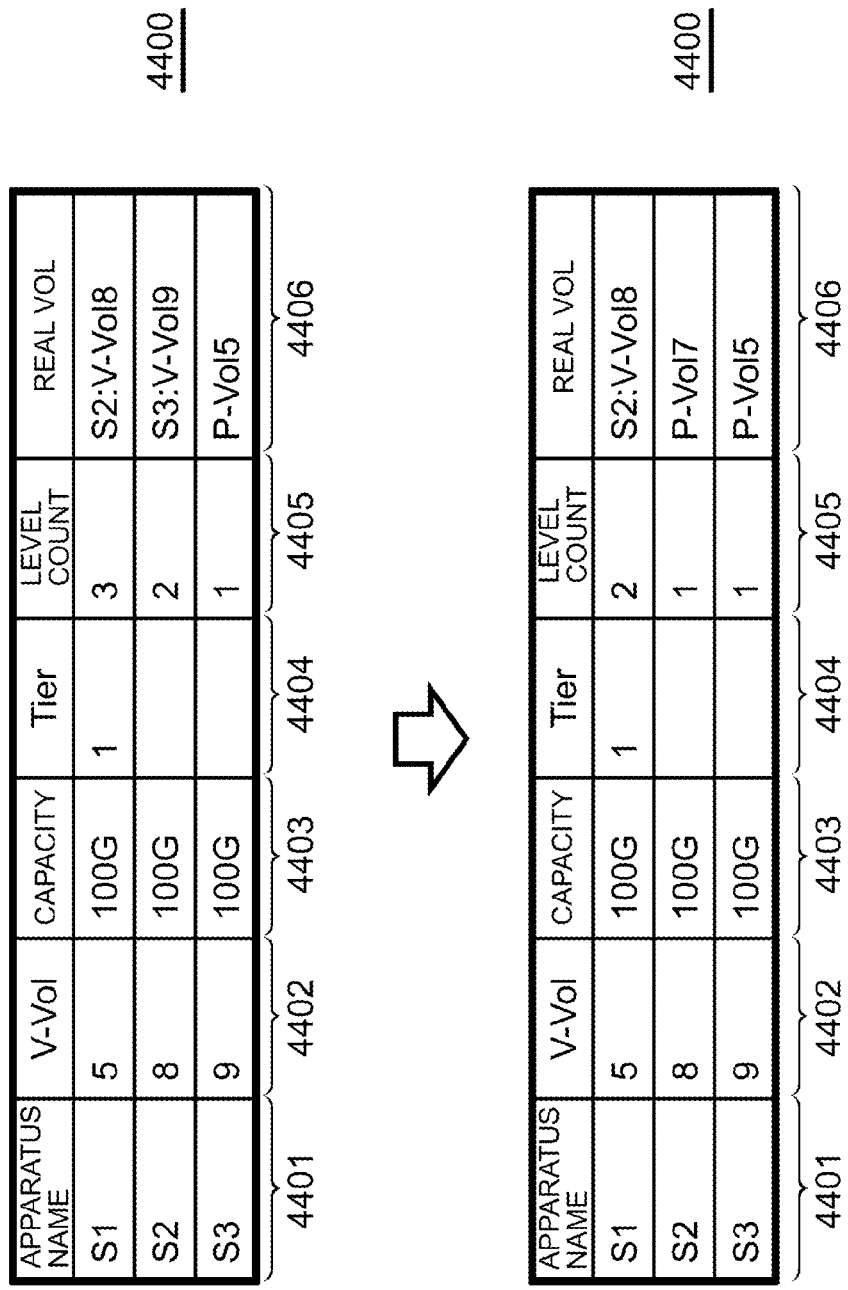

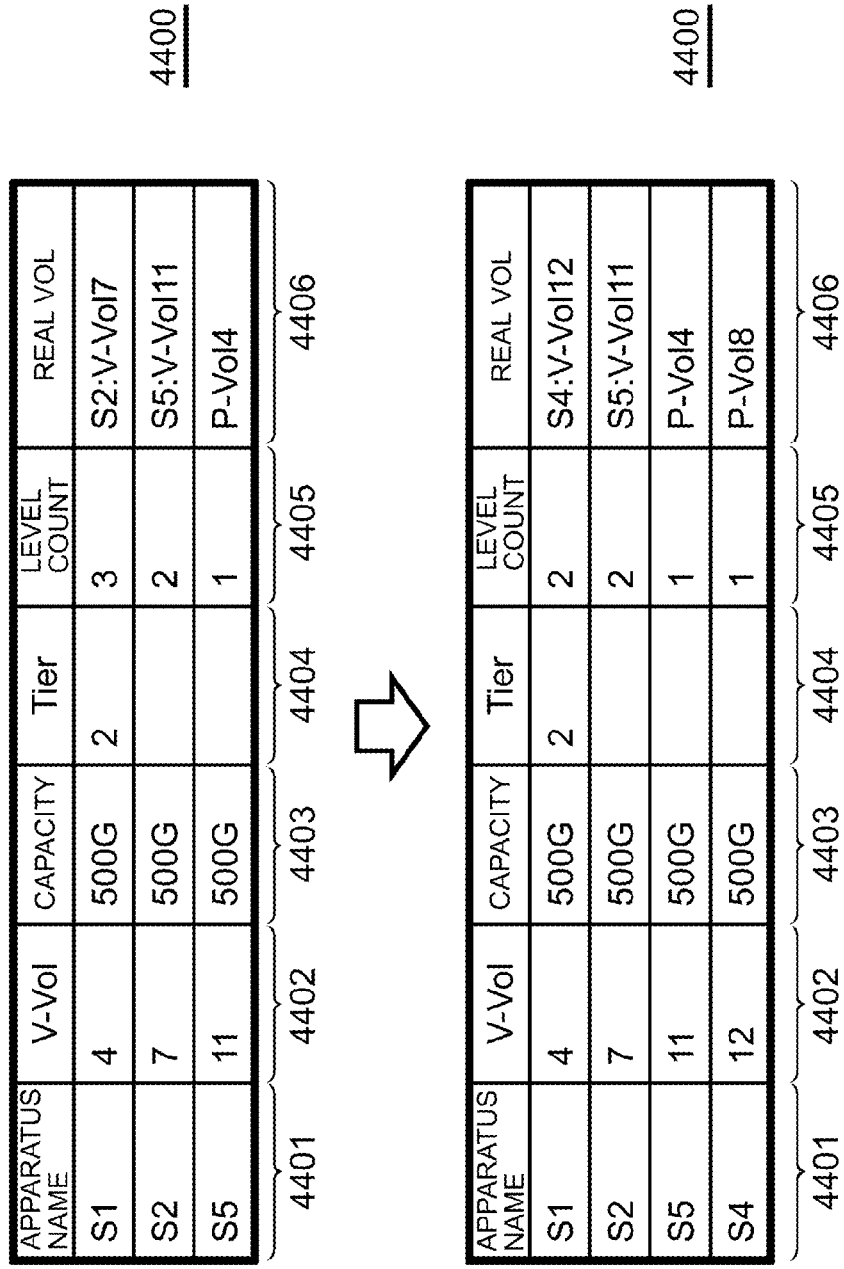

MANAGEMENT COMPUTER AND VOLUME CONFIGURATION MANAGEMENT METHOD

TECHNICAL FIELD

The present invention relates to a management computer and a volume configuration management method, and, in particular, can be suitably applied to a management computer and a volume configuration management method for optimizing the configuration of volumes provided by a plurality of storage apparatuses which have an external connection function.

BACKGROUND ART

In recent years, Thin Provisioning, which employs a virtual volume without its own storage area (hereinafter referred to as the 'virtual volume'), has come into widespread use for the purpose of simplifying operations management and unifying storage environments as storage environments grow larger and more complex due to increased amounts of enterprise data.

With Thin Provisioning, if a virtual volume is presented to a host device and there is write access by the host device to the virtual volume, a physical storage area for actually storing data is assigned to the virtual volume. As a result, the storage area in the storage apparatus can be used efficiently while a volume of a capacity equal to or greater than the storage area in the storage apparatus is presented to the host device.

In addition, the storage apparatus comprises a plurality of hard disk drives (HDD) for storing data according to write access by the host computer. Furthermore, through RAID (Redundant Arrays of Independent Disks) technology, the storage areas of the plurality of hard disk drives are made redundant and a RAID group is configured. Physical disks of the hard disk drives and logical volumes which are segmented from a portion of the storage area of the RAID group are used as volumes which are recognized by the host computer for the storage of data.

In order to facilitate management of these volumes and management of the volume capacity, PTL 1 discloses a technology known as the 'external connection function.' With the external connection function, a volume provided by a second storage apparatus (hereinafter referred to as the 'external storage apparatus') which is connected to a first storage apparatus can be associated with a virtual volume provided by the first storage apparatus. Hereinafter an association of a volume provided by the external storage apparatus with the virtual volume will be called an external connection.

Furthermore, if an I/O request for a virtual volume transmitted from the host computer is received by the first storage apparatus, the I/O request can be transferred to a volume of an external storage apparatus which corresponds to the virtual volume. As a result, when the system administrator provides the volumes of the storage apparatuses to the host computer, since only the first storage apparatus may be managed, management of the volumes can be facilitated by centrally managing the volumes. In addition, by presenting a virtual volume to the host computer, the amount of storage areas which are handled by the first storage apparatus can undergo an apparent increase.

Accordingly, if there is a request to assign a volume to the host computer, even when there is insufficient unused capacity in the volume of the actual storage apparatus, volume in the designated capacity can be provided from an externally connected storage apparatus. Furthermore, a volume on the same tier as the tier of the designated volume can also be provided by means of an external connection.

CITATION LIST

Patent Literature

PTL 1: Japanese Unexamined Patent Application Publication No. 2004-005370

SUMMARY OF INVENTION

Technical Problem

However, even though an apparent increase in the amount of storage area handled by the first storage apparatus is facilitated by providing a volume in the same tier by means of an external connection, a configuration in which a volume is permanently provided by means of an external connection will likely degrade the I/O performance of this volume.

The present invention was conceived in view of the points above and proposes a management computer and volume configuration management method which enable optimization of the configuration of the volumes provided by a plurality of storage apparatuses with an external connection function.

Solution to Problem

In order to solve this problem, the present invention provides a management computer which is mutually connected, via a network, to a plurality of storage apparatuses including a substantial real volume, and a host computer which requests writing of data to the plurality of storage apparatuses, wherein, by associating a virtual volume provided to the host computer with the real volume of another storage apparatus other than their own, the plurality of storage apparatuses manage the real volume of the other storage apparatus as the real volume of the storage apparatus, comprising a detection unit which detects a correspondence relationship between the virtual volume of one storage apparatus among the plurality of storage apparatuses and the real volume of the one storage apparatus or of the other storage apparatus; and a modification unit which, if the real volume is added to any of the plurality of the storage apparatuses, modifies the correspondence relationship between the virtual volume and the real volume associated with the virtual volume, according to the correspondence relationship detected by the detection unit.

With this configuration, a management computer which is connected via a network to a plurality of storage apparatuses with an external connection manages the configuration of volumes which include virtual volumes and real volumes of a plurality of storage apparatuses, and if a real volume is added to the storage apparatuses, a correspondence relationship between the virtual volume and real volume is modified to create a suitable volume configuration. Consequently, the man-hours for volume configuration management by the system administrator can be reduced by optimizing the configuration of the volumes provided by means of an external connection function.

Advantageous Effects of Invention

According to the present invention, the configuration of volumes provided by the plurality of storage apparatuses with an external connection function can be optimized in order to be able to reduce the man-hours for volume configuration management by the system administrator.

BRIEF DESCRIPTION OF DRAWINGS

FIG. 7 is a table showing an example of an external connection level count management table according to this embodiment.

FIG. 8*a* is a table showing an example of a permissible level count management table according to this embodiment.

FIG. 8*b* is a table showing an example of a permissible level count management table according to this embodiment.

FIG. 13*a* is a table showing an example of an external connection level count management table according to this embodiment.

FIG. 13*b* is a table showing an example of an external connection level count management table according to this embodiment.

FIG. 13*c* is a table showing an example of an external connection level count management table according to this embodiment.

FIG. 17 is a table showing an example of an external connection level count management table according to this embodiment.

FIG. 18 is a table showing an example of an external connection level count management table according to this embodiment.

FIG. 24 is a table showing an example of an external connection level count management table according to this embodiment.

FIG. 26 is a table showing an example of an external connection level count management table according to this embodiment.

FIG. 27 is a table showing an example of an external connection level count management table according to this embodiment.

FIG. 28 is a table showing an example of an external connection level count management table according to this embodiment.

DESCRIPTION OF EMBODIMENTS

An embodiment of the present invention will be described in detail hereinbelow with reference to the drawings.

(1) First Embodiment (1-1) Hardware Configuration of Computer System

Figure 1:
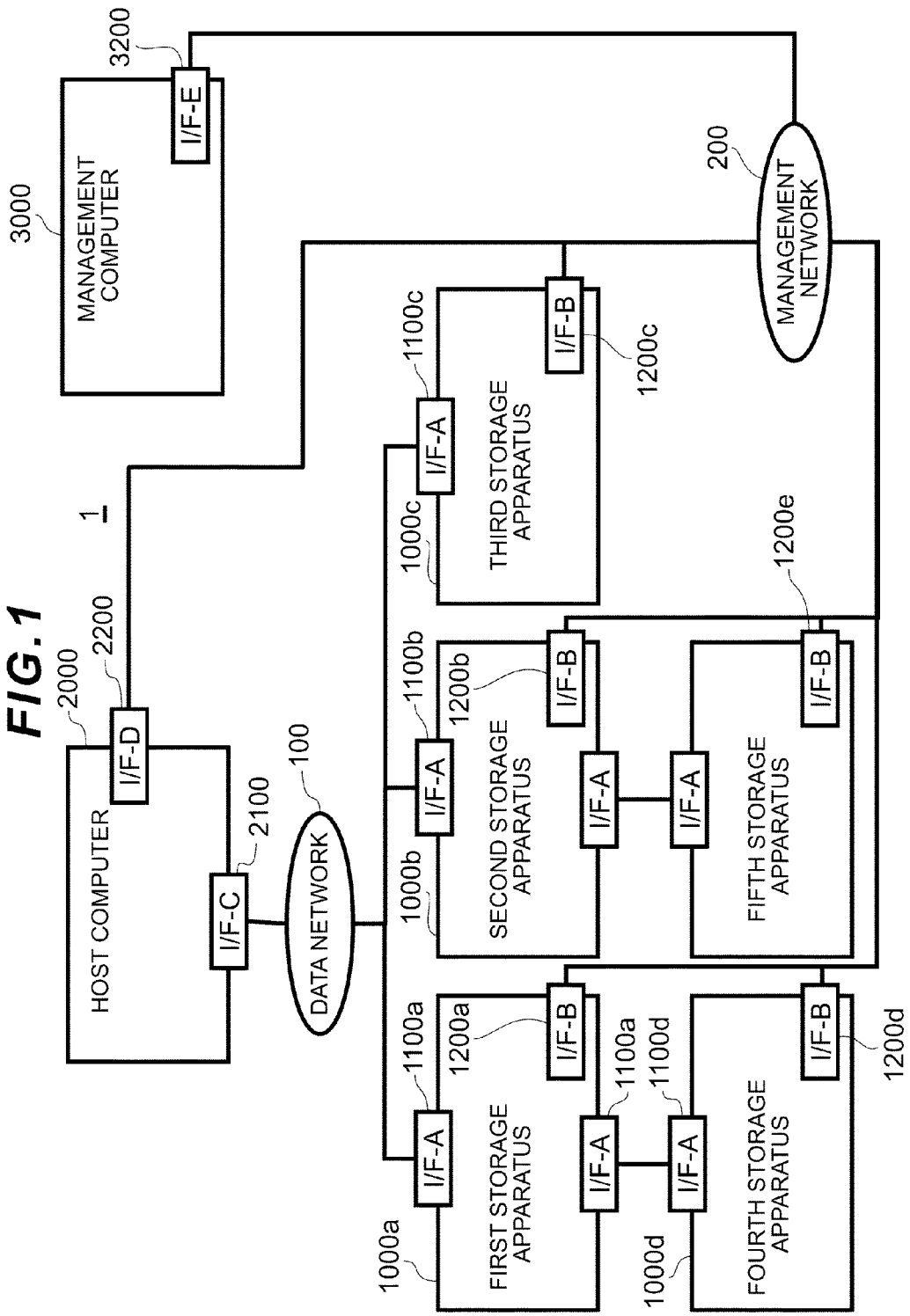
FIG. 1 is a block diagram showing a hardware configuration of a computer system according to a first embodiment of the present invention.

First of all, the hardware configuration of a computer system 1 according to this embodiment will be described with reference to FIG. 1. As shown in FIG. 1, the computer system 1 according to this embodiment comprises storage apparatuses 1000*a*, 1000*b*, 1000*c*, 1000*d*, and 1000*e* (hereinafter sometimes referred to as the storage apparatuses 1000), a host computer 2000, a management computer 3000, a data network 100 and a management network 200.

In addition, the storage apparatuses 1000 are connected to the host computer 2000 via the data network 100, and connected to the management computer 3000 via the management network 200.

The data network 100 is configured from a SAN (Storage Area Network) or the like, for example, and inter-device communications are executed in accordance with the Fibre Channel Protocol, for example. Furthermore, the data network 100 may also be a LAN (Local Area Network), the Internet, a public line or a dedicated line or similar, for example. If the data network 100 is a LAN, the inter-device communications are executed according to the TCP/IP (Transmission Control Protocol/Internet Protocol) protocol.

The management network 200 may also be an IP (Internet Protocol) network or LAN or the like or another kind of network. More particularly, the management computer 3000 may manage the storage apparatuses 1000 and host computer 2000 via the management network 200. For example, if the management computer 3000 comprises a plurality of I/Fs (Interfaces), it may also manage other apparatuses via a plurality of networks, i.e. be connected to the host computer 2000 via a LAN and connected to the storage apparatuses 1000 via a SAN. Furthermore, the data network 100 and management network 200 may also be the same network.

The storage apparatuses 1000 parse commands which are transmitted from the host computer 2000 connected via the data network 100 and execute reading/writing from/to the storage medium in the storage apparatuses 1000.

Additionally, the host computer 2000 may be connected to the storage apparatuses 1000 via the data network 100. The host computer 2000 transmits data read/write requests to the storage apparatuses 1000 connected via the data network 100.

In addition, the management computer 3000 is connected to the storage apparatuses 1000 or the host computer 2000 via the management network 200.

Although, in this embodiment, the configuration is such that the management program which runs on the management computer 3000 mainly manages the host computer 2000 and the storage apparatuses 1000, this invention is not limited to this example. For example, some or all the management program may also be executed in the storage apparatuses 1000 or the host computer 2000. In addition, although, in FIG. 1, a plurality of storage apparatuses 1000, the host computer 2000, and the management computer 3000 are each connected via a single connection, this invention is not limited to this arrangement; rather the configuration may be such that a plurality of the host computer 2000 and management computer 3000 are connected via a plurality of connections.

Figure 2:
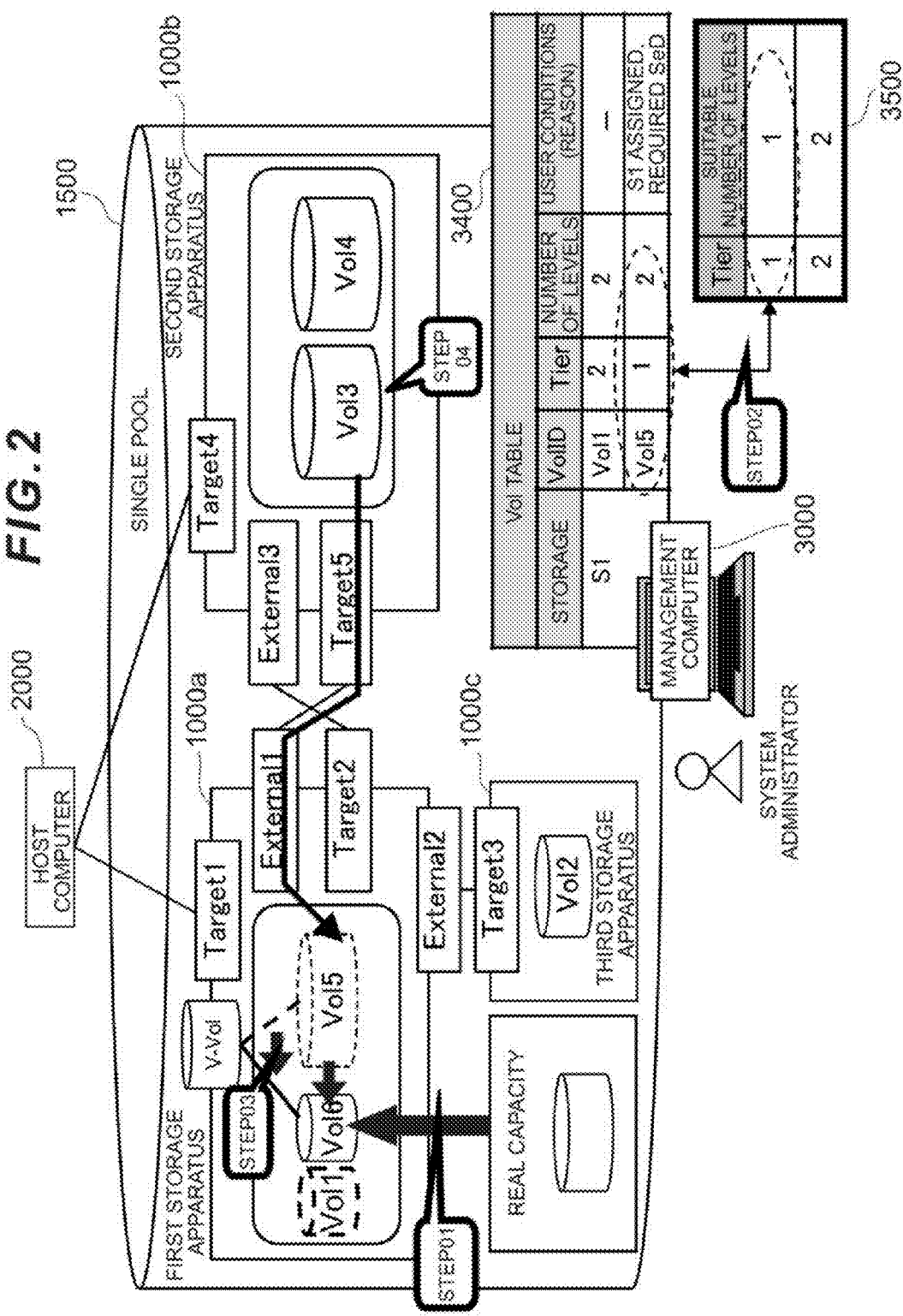
FIG. 2 is a conceptual view providing an outline according to this embodiment.

Here, an outline of this embodiment will be provided. As shown in FIG. 2, according to this embodiment, the storage areas of the storage media provided by the plurality of storage apparatuses 1000 are integrated into a single pool 500 and provided to the host computer 2000 as a volume to be handled by the first storage apparatus 1000a. As a result, the system administrator of the computer system 1 is able to recognize the storage area of the single pool 500 as a storage area which can be provided to the host computer 2000. In addition, if there is a request to assign a volume from the host computer 2000, even when there is insufficient unused capacity in the volume of the actual storage apparatus 1000, by externally connecting a volume of another storage apparatus, a volume of the designated capacity can be supplied from the host computer 2000.

For example, as shown in FIG. 2, the storage areas of the storage media provided from the first storage apparatus 1000a, second storage apparatus 1000b, and third storage apparatus 1000c are integrated into the single pool 500 and recognized by the system administrator as a storage area which can be provided to the host computer 2000. In addition, the first storage apparatus 1000a provides the virtual volume (V-Vol) to the host computer 2000. Furthermore, through external connections, the real volumes of the second storage apparatus 1000b and third storage apparatus 1000c can be handled as volumes of the first storage apparatus 1000a.

Specifically, an external connection employs a SCSI command-based SAN and in the case of a SAN, a distinction must be made between the side (Initiator) where data transmission/reception is started and the side (Target) where the data transmission/reception is received, and hence the attribute of a connection port on the side where the volume is introduced is made 'Initiator' (also when an attribute 'External' is supplied), and hence the attribute of a connection port on the side where the volume is provided must be made the 'Target.' For example, the first storage apparatus 1000a, the second storage apparatus 1000b, and the third storage apparatus 1000c are externally connected in order to be able to provide the volume of the second storage apparatus 1000b or the third storage apparatus 1000c to the host computer 2000 as the volume of the first storage apparatus 1000a.

However, even though an apparent increase in the amount of storage area handled by the first storage apparatus 1000a can be handled by means of an external connection, the configuration for permanently providing volumes by means of an external connection may degrade the I/O performance of these volumes. Conventionally, the system administrator is unable to recognize whether a volume of another storage apparatus is provided by an external connection by way of such a process and it is hard to manage a suitable volume configuration. Therefore, in this embodiment, storage apparatuses 1000 which are capable of easily managing whether a suitable configuration with which a volume provided to the host computer 2000 does not bring about deterioration of the I/O performance are provided.

Specifically, the computer system 1 uses the management computer 3000 to manage configurations, from tiers (storage tiers) of a virtual volume (V-Vol) provided to the host computer 2000 to the apparatuses where real volumes associated with the virtual volume are present. Hereinafter, the configuration up to and including the apparatus where real volumes associated with virtual volumes exist is managed as the 'level count.' Furthermore, for each of the tiers, a suitable number of levels, up to and including the apparatus with real volumes associated with the virtual volumes, are held by the management computer 3000.

For example, suppose that a real volume (Vol 6) is added to the first storage apparatus 1000a of the computer system 1 (STEP 01). Here, the management computer 3000 compares the external connection level count management table 3400 for managing the number of levels of volumes connected by external connections and a permissible level count management table 3500 for managing the suitable number of levels of volumes connected by the external connection (STEP 02).

Furthermore, the management computer 3000 determines whether or not there are virtual volumes in a suitable number of levels among the virtual volumes provided to the first storage apparatus 1000a via an external connection (STEP 03). For example, the number of tier of virtual volume Vol 5 of the first storage apparatus 1000a is '1'. When referring to the permissible level count management table 3500, the suitable number of levels in the case of Tier '1' is '1'. However, when referring to the external connection level count management table 3400, the number of levels of Vol 5 is '2'. Hence, it can be determined that the number of levels of the virtual volume Vol 5 is not a suitable level count.

It is thus determined whether a suitable configuration can be obtained by associating a real volume Vol 6, added in STEP 01, to the virtual volume Vol 5 (STEP 04). If it is determined in STEP 04 that a suitable configuration can be obtained associating the real volume Vol 6 with the virtual volume Vol 5, the volume configuration of the first storage apparatus 1000a can be modified for a suitable configuration. Modification of the volume configuration is realized by migrating the data of externally connected real volumes to a newly added real volume.

Figure 3:
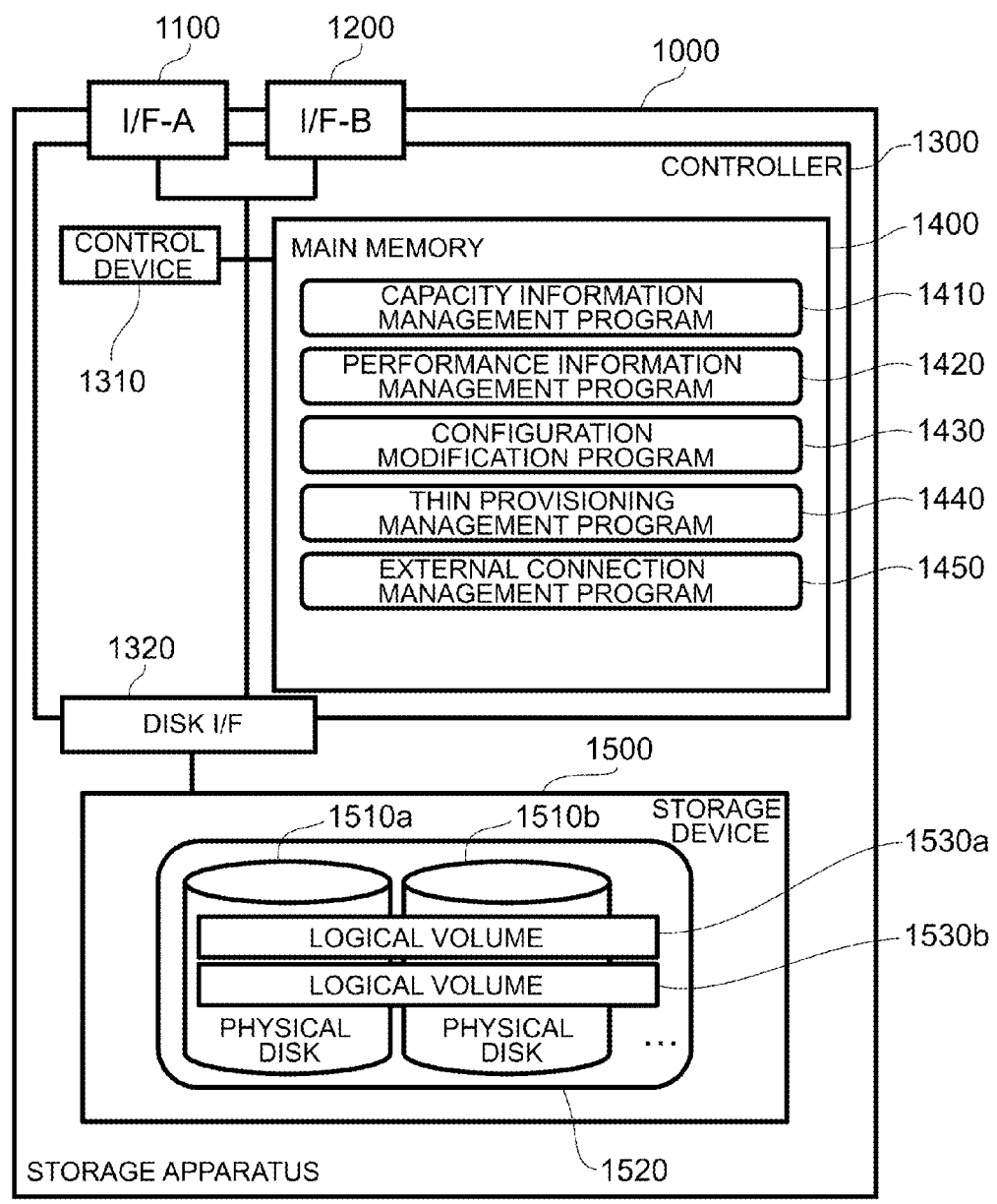
FIG. 3 is a block diagram showing a configuration of a storage apparatus according to this embodiment.

(1-2) Configuration of Each Apparatus (1-2-1) Configuration of the Storage Apparatus The hardware configuration and software configuration of the storage apparatuses 1000 will be explained in detail next. As shown in FIG. 3, the storage apparatuses 1000 mainly comprise a controller 1300 and a storage device 1500.

Provided in the controller 1300 are an interface (I/F-A) 1100, an interface (I/F-B) 1200, a control device 1310, a main memory 1400, and a disk interface (disk I/F) 1320.

The interface (I/F-A) 1100 is an interface for connecting to the data network 100 and includes a port or the like. In addition, the interface (I/F-B) 1200 is an interface for connecting to the management network 200. If the management network 200 is a SAN, the interface (I/F-A) 1100 and interface (I/F-B) 1200 may also be the same interface. Furthermore, although the storage apparatuses 1000 include one each of the interface (I/F-A) 1100 and the interface (I/F-B) 1200 in this embodiment, the number of interfaces is not limited to this example.

The control device 1310 functions as an arithmetic processing device and is configured, for example, from a CPU (Central Processing Unit). The control device 1310 controls the operations of the storage apparatuses 1000 according to the programs and computational parameters stored in the memory. The main memory 1400 stores the programs and computational parameters and the like. The disk interface 1320 is an interface for transmitting or receiving data to/from the storage device 1500. In addition, the controller 1300 may include a cache memory which is used to speed up data reading/writing.

The main memory 1400 stores various programs for managing the configuration of the storage apparatuses and, specifically, stores a capacity information management program 1410, a performance information management program 1420, a configuration modification program 1430, a Thin Provisioning management program 1440, and an external connection management program 1450.

The capacity information management program 1410 is a program which, in accordance with an instruction from the management computer 3000 or the like, acquires information relating to the storage areas and volumes in the storage apparatus 1000 and transmits the acquired information to the management computer 3000. The volume configuration in the storage apparatus 1000 can be provided to the management computer 3000 by the capacity information management program 1410.

The performance information management program 1420 is a program which, in accordance with an instruction from the management computer 3000 or the like, acquires information relating to the I/O performance of the ports and volumes in the storage apparatuses 1000 and transmits the acquired information to the management computer 3000. The I/O performance of the ports and volumes in the storage apparatus 1000 can be provided to the management computer 3000 by the performance information management program 1420.

The configuration modification program 1430 is a program which, in accordance with an instruction from the management computer 3000 and the like, effects various configurations and modifications in the storage apparatuses 1000. Here, a configuration modification denotes, for example, the creation of a virtual volume which is provided to the host computer 2000, the addition of a real volume, or modification of port attributes, and the like.

The Thin Provisioning management program 1440 is a program for providing and managing a Thin Provisioning function. The Thin Provisioning function is a function which does not provide logical volumes as storage areas of a fixed capacity to the host computer 2000, and provides the host computer 2000 with a virtual volume without its own storage area. More specifically, the Thin Provisioning function is a function for assigning a partial area (called a segment, page or the like) of a pre-prepared storage area (pool) to a written area of a virtual volume in response to processing to write data to a virtual volume from the host computer 2000.

The external connection management program 1450 is a program for providing and managing the aforementioned external connection function. More specifically, volumes which are provided by an external storage apparatus other than the storage apparatus 1000 are handled as virtual volumes within the storage apparatus 1000. Furthermore, if an I/O request is made to an externally connected virtual volume from the host computer 2000, the I/O request is transferred to the volume which corresponds to the virtual volume of the external storage apparatus.

The storage device 1500 comprises a plurality of physical disks 1510*a* and 1510*b* (hereinafter referred to as the 'physical disks 1510'). The physical disks 1510 are configured from a plurality of Hard Disk Drives (HDD) and Solid State Drives (SSD) including high-cost hard disk drives such as SCSI (Small Computer System Interface) disks and low-cost hard disk drives such as SATA (Serial AT Attachment) disks. In addition, in this embodiment, data of high importance is stored in the high-performance storage tier and data of low importance is stored in the low-performance storage tier. As a result, physical disks of a plurality of types of varying performance can be used efficiently.

Furthermore, a physical disk group 1520 is formed by one or more physical disks 1510. An example of the physical disk group 1520 is a RAID. Furthermore, one or more logical volumes 1530*a* and 1530*b* (hereinafter referred to as the 'logical volumes 1530') are defined on a storage area provided by the group 1520. Furthermore, the logical volumes 1530 provided by one or more groups 1520 are managed as one single pool 500.

Note that the storage device 1500 is configured, for example, from an expansion enclosure which is installed when physically expanding the capacity of the storage apparatus 1000. In addition, the storage device 1500, the physical disk 1510, the group 1520, and the logical volume 1530 are not limited in their respective numbers, nor do each of these numbers limit the present invention.

(1-2-2) Configuration of Host Computer

Figure 4:
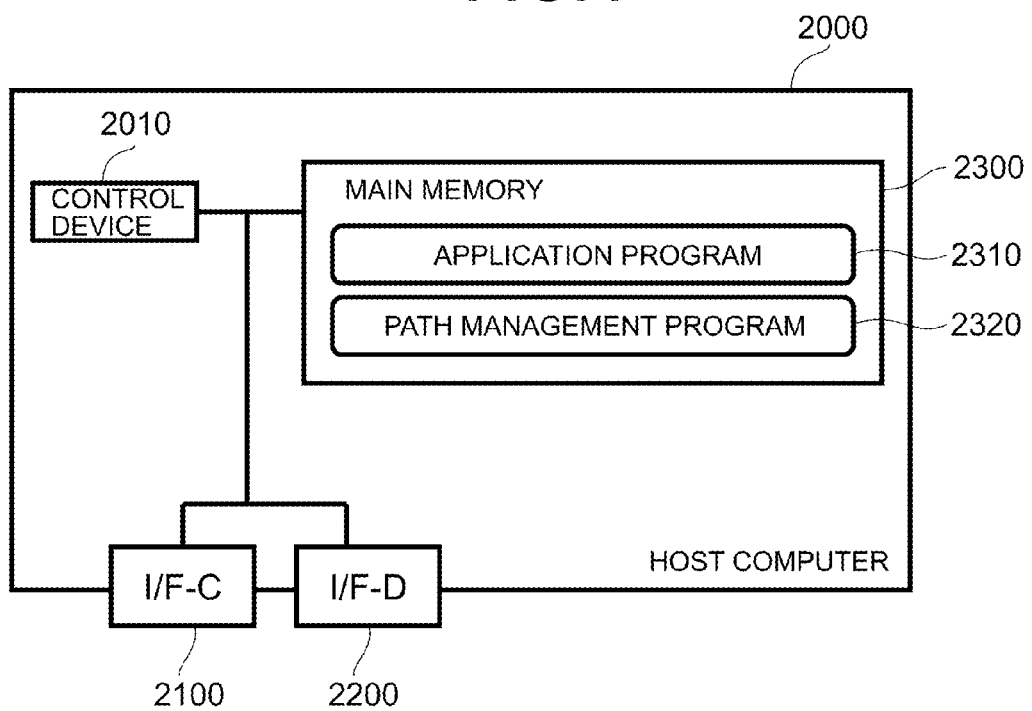
FIG. 4 is a block diagram showing a configuration of a host computer according to this embodiment.

The hardware configuration and software configuration of the host computer 2000 will be explained in detail next. As shown in FIG. 4, the host computer 2000 mainly comprises a control device 2010, an interface (I/F-C) 2100, an interface (I/F-D) 2200, and a main memory 2300. The host computer 2000 is configured from a personal computer, a work station, a mainframe, or the like, for example.

The control device 2010 functions as an arithmetic processing device and is configured, for example, from a CPU. The control device 2010 controls the operations of the host computers 2000 according to the programs and computational parameters stored in the memory. The main memory 2300 stores the programs and computational parameters and the like.

The interface (I/F-C) 2100 is an interface for connecting to the data network 100. If the data network 100 is configured from a SAN, an HBA (Host Bus Adapter) serves as an example of the interface (I/F-C) 2100. In addition, the interface (I/F-D) 2200 is an interface for connecting to the management network 200. In addition, if the management network 200 is configured from a LAN, the NIC (Network Interface Card), for example, serves as an example of the interface (I/F-D) 2200.

The main memory 2300 stores an application program 2310 and a path management program 2320 and the like. The application program 2310 is a program for accessing a volume provided by the storage apparatus 1000 and exemplifies a DBMS (Database Management System) or the like, for example.

In addition, the path management program 2320 is a program for managing a communication path from the host computer 2000 to a volume which is stored in the storage apparatus 1000. When the host computer 2000 accesses the volumes of the storage apparatuses 1000, in addition to passing via the interface (I/F-C) 2100 in the host computer 2000 and the interface I/A-A) 1100 in the storage apparatuses 1000, access is routed via several switches and the like according to the configuration of the data network 100.

Where this path is concerned, the path management program 2320 identifies a path linking one of the interfaces (I/F-C) 2100 and one of the interfaces (I/A-A) 1100 as a single path. In an environment where there is a plurality of paths enabling the host computer 2000 to access the volumes of the storage apparatuses 1000, the path management program 2320 comprises a function for switching to another path, in which no fault occurs, without affecting the application program 2310, if a fault is generated in the path used during access. Here, 'without affecting the application program 2310' indicates a state where online processing is continued while online.

In addition, dynamic paths can be modified during online processing as a result of co-operation between the path management program 2320 and the program of the storage apparatus 1000. More specifically, the paths between the host computer 2000 and the storage apparatuses 1000 are modified by changing the ports used by the storage apparatuses 1000 by means of the path management program 2320 and the program of the storage apparatus 1000.

The host computer 2000 may additionally comprise a local disk for storing an OS (Operating System) and so on, information input devices such as a keyboard, switch, pointing device, and microphone, and information output devices such as a monitor display and speaker. In addition, the host computer 2000 may include a cache memory which is used to speed up data reading/writing.

(1-2-3) Configuration of Management Computer

Figure 5:
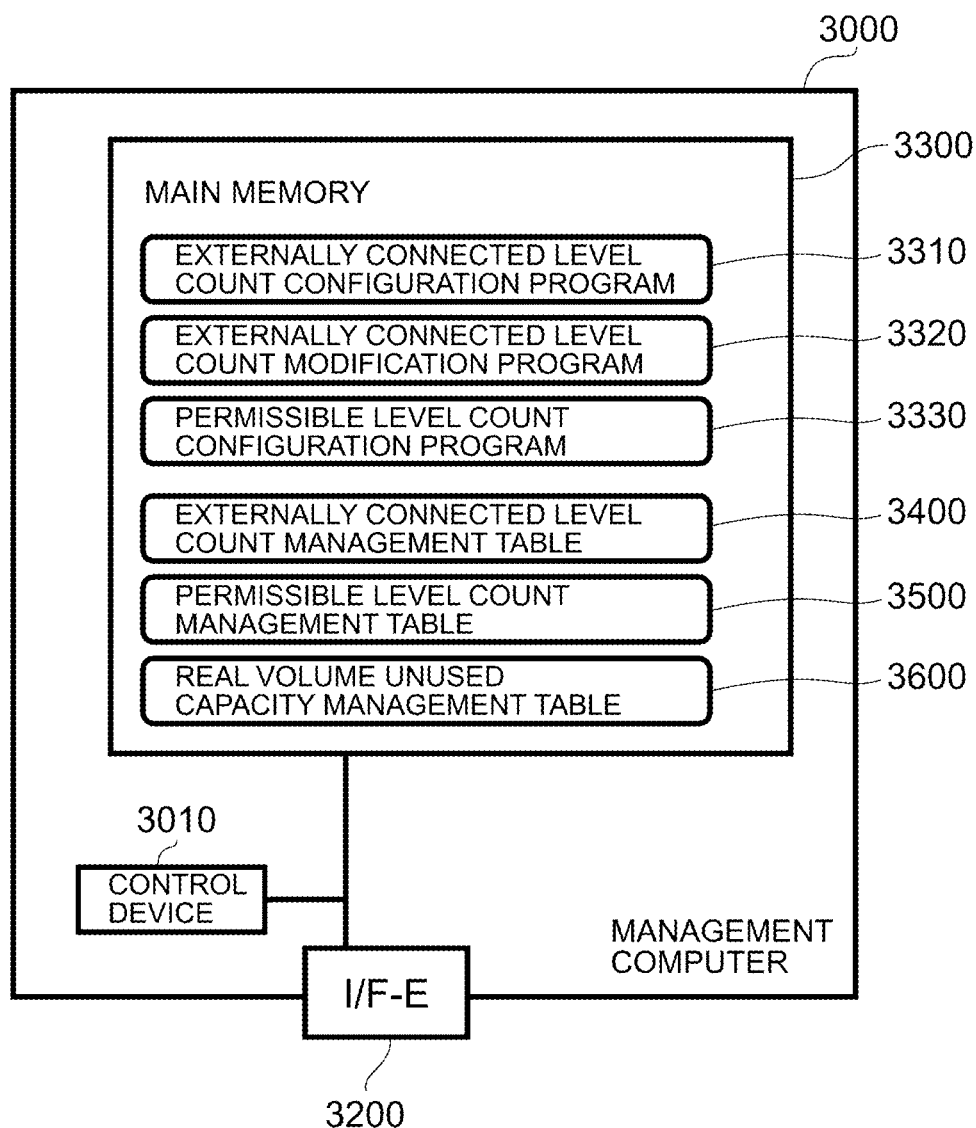
FIG. 5 is a block diagram showing a configuration of a management computer according to this embodiment.

The hardware configuration and software configuration of the management computer 3000 will be explained in detail next. As shown in FIG. 5, the management computer 3000 is mainly configured from a control device 3010, an interface (I/F-E) 3200, and a main memory 3300. The management computer 3000 is configured from a personal computer, a work station, a mainframe, or the like.

The control device 3010 functions as an arithmetic processing device and is configured, for example, from a CPU. The control device 3010 controls the operations of the host computer 3000 according to the programs and computational parameters stored in the memory. The main memory 3300 stores the programs and computational parameters and the like.

The interface (I/F-E) 3200 is an interface for connecting to the management network 200 and, if the management network 200 is configured from a LAN, exemplifies an NIC, for example.

The main memory 3300 stores an external connection level count configuration program 3310, an external connection level count modification program 3320, a permissible level count configuration program 3330, an external connection level count management program 3400, a permissible level count management table 3500, and a real volume unused capacity management table 3600, and the like. Note that the external connection level count configuration program 3310 is an example of a detection unit of the present invention and the external connection level count modification program 3320 is an example of a modification unit of the present invention.

If a virtual volume which is provided by the Thin Provisioning function is created, the external connection level count configuration program 3310 is a program which registers information, relating to the number of levels to the apparatus where the real volume associated with the virtual volume exists, in the external connection level count management table 3400. In this embodiment, the external connection level count configuration program 3310 registers the correspondence relationships between the virtual volume and real volume in the external connection level count management table 3400. Furthermore, the external connection level count configuration program 3310 registers the storage tier of each virtual volume in the external connection level count management table 3400 in association with the virtual volume.

Figure 6:
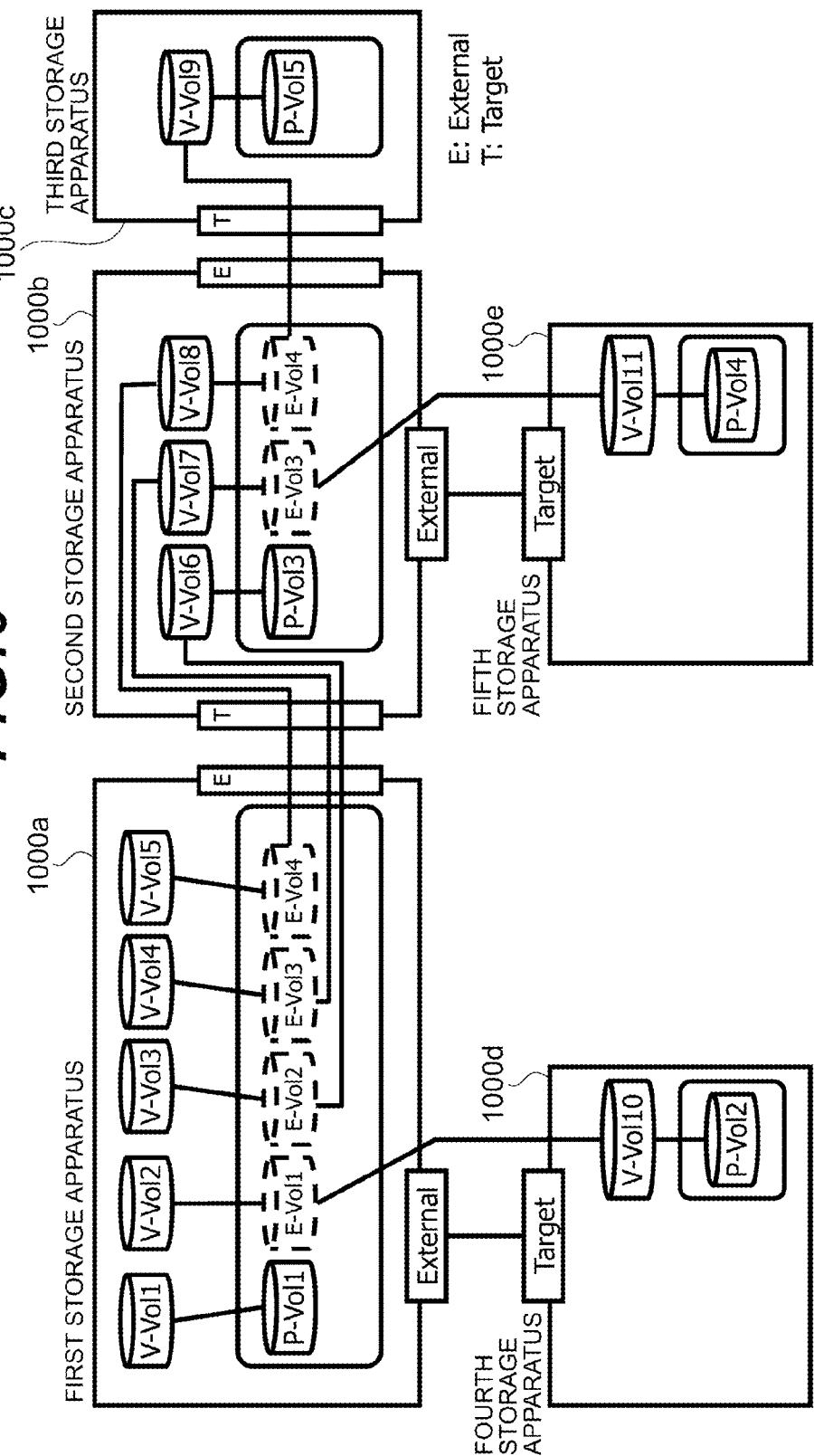
FIG. 6 is a conceptual view of a volume configuration of the storage apparatus according to this embodiment.

For example, the five storage apparatuses, namely the first storage apparatus 1000a to the fifth storage apparatus 1000e have the configuration shown in FIG. 6. For example, the first storage apparatus 1000a provides five virtual volumes (V-Vol 1, V-Vol 2, V-Vol 3, V-Vol 4, and V-Vol 5) to the host computer 2000. In addition, the virtual volume V-Vol 1 is associated with a real volume P-Vol in the first storage apparatus 1000a. In this case, the external connection level count configuration program 3310 recognizes that the association of virtual volume V-Vol 1 with the real volume P-Vol in the first storage apparatus 1000a is registered in the external connection level count management table 3400, and that the number of levels to the apparatus where the real volume of the virtual volume V-Vol 1 exists is the single level of the 'first storage apparatus 1000a.'

In addition, the virtual volume V-Vol 2 is associated with a virtual volume V-Vol 10 in the fourth storage apparatus 1000d. Here, an externally connected volume E-Vol 1 is a logical volume without an entity for recognizing the volume of the fourth storage apparatus 1000d as an external volume. Therefore, the number of levels to the apparatus where the real volume of the virtual volume V-Vol 2 exists is recognized as being two, namely, the 'first storage apparatus 1000a,' and the 'fourth storage apparatus 1000d.' Furthermore, the virtual volume V-Vol 3 is associated with the virtual volume V-Vol 6 of the second storage apparatus 2000b and the V-Vol 6 is associated with the real volume P-Vol 3 in the second storage apparatus 1000b. Therefore, the number of levels up to and including the apparatus where the real volume of the virtual volume V-Vol 3 exists is recognized as being two, namely, the 'first storage apparatus 1000a,' and the 'second storage apparatus 1000b.'

Furthermore, the virtual volume V-Vol 4 is associated with the virtual volume V-Vol 7 of the second storage apparatus 1000b and the V-Vol 7 is associated with the V-Vol 11 in the fifth storage apparatus 1000e. In addition, the V-Vol 11 is associated with a real volume P-Vol 4 in the fifth storage apparatus 1000e. Therefore, the number of levels up to and including the apparatus where the real volume of the virtual volume V-Vol 4 exists is recognized as being three, namely, the 'first storage apparatus 1000a,' the 'second storage apparatus 1000b,' and the 'fifth storage apparatus 1000e.'

Furthermore, the virtual volume V-Vol 5 is associated with the virtual volume V-Vol 8 of the second storage apparatus 1000b, the V-Vol 8 is associated with the V-Vol 9 of the third storage apparatus 1000c, and the V-Vol 9 is associated with the real volume P-Vol 5 in the third storage apparatus 1000c. Therefore, the number of levels up to and including the apparatus where the real volume of the virtual volume V-Vol 5 exists is recognized as being three, namely, the 'first storage apparatus 1000*a*,' the 'second storage apparatus 1000*b*,' and the 'third storage apparatus 1000*c*.'

The external connection level count configuration program 3310 acquires information relating to the configuration of the aforementioned volumes from the first storage apparatus 1000*a* and registers this information in the external connection level count management table 3400. The external connection level count management table 3400 is a table for managing the number of levels of externally connected virtual volumes and, as shown in FIG. 7, comprises an apparatus name field 3401, a V-Vol field 3402, a capacity field 3403, a Tier field 3404, and a real Vol field 3405, and the like.

The apparatus name field 3401 stores the storage name of the storage apparatuses 1000. For example, the names assigned are 'S1', assigned to the first storage apparatus 1000*a*, 'S2', assigned to the second storage apparatus 1000*b*, 'S3', assigned to the third storage apparatus 1000*c*, 'S4', assigned to the fourth storage apparatus 1000*d*, and 'S5', assigned to the fifth storage apparatus 1000*e*.

The V-Vol field 3402 stores numbers identifying virtual volumes which are created in the storage apparatuses 1000. The capacity field 3403 stores the capacities of each of the virtual volumes. The Tier field 3404 stores the storage tiers of each of the virtual volumes. In addition, the real volume field 3405 stores information relating to the number of levels to the apparatus where the real volume associated with each virtual volume exists, and specifically stores the apparatus name and volume name which are associated with the virtual volume.

For example, the virtual volume V-Vol 1 is associated with the real volume P-Vol 1 of the first storage apparatus 1000*a* and therefore the real volume field 3405 stores the apparatus name 'S1' of the first storage apparatus 1000*a* and the 'P-Vol 1' of the real volume name. It can be seen that the real volume field 3405 only stores an apparatus name S1 which is the same as that in the apparatus name field 3401 and hence the number of levels of virtual volumes is one. It can likewise be seen that the real volume field 3405 which corresponds to the virtual volume V-Vol 2 stores 'S4: V-Vol 10, S4: P-Vol 2', and stores an apparatus name S4 which is different from the apparatus name S1 of the apparatus name field 3401, and hence the number of levels of the virtual volumes is two.

It is likewise clear for the virtual volume V-Vol 3 that since the real volume field 3405 stores one apparatus name S2 which differs from the apparatus name S1 in the apparatus name field 3401, the number of levels of the virtual volumes is two. It can also be seen that, for the virtual volumes V-Vol 4 and V-Vol 5, the real volume field 3405 stores two apparatus names which differ from the apparatus name S1 in the apparatus name field 3401, and hence the number of levels of the virtual volumes is three.

The external connection level count modification program 3320 refers to the external connection level count management table 3400 in which real volumes and so on are registered by the external connection level count configuration program 3310, and modifies the configuration of the volumes in each of the storage apparatuses 1000 to create a suitable configuration. More specifically, if a real volume is added to a storage apparatus 1000, the external connection level count modification program 3320 determines whether or not the number of levels of volumes in the storage apparatus 1000 is a suitable level count. Furthermore, the configuration of the volumes is modified by migrating data to establish a suitable number of levels for volumes with an unsuitable level count. In addition, the external connection level count modification program 3320 updates the real volume field 3405 of the external connection level count management table 3400 based on the results of modifying the volume configuration.

The permissible level count configuration program 3330 has a function for configuring the number of permissible levels corresponding to each of the volumes in the permissible level count management table 3500 in response to an input from the system administrator. The external connection level count modification program 3320 refers to the permissible level count management table 3500 to determine whether or not the number of levels of volumes is a suitable level count. The permissible level count management table 3500 is a table for managing the permissible level count which is configured for each of the volumes of the storage apparatuses 1000.

As shown in FIG. 8*a*, the permissible level count management table 3500*a* is configured from an apparatus name field 3501, a V-Vol field 3502, and a permissible level count field 3503. The apparatus name field 3501 stores the storage names of the storage apparatuses 1000. The V-Vol field 3502 stores numbers identifying virtual volumes in the storage apparatuses 1000. The permissible level count 3503 stores a permissible level count for each virtual volume.

For example, the external connection level count modification program 3320 refers to the permissible level count management table 3500*a* and recognizes that the permissible level count of the virtual volume V-Vol 1 is '1'. Furthermore, if a real volume associated with the virtual volume V-Vol 1 exists in a storage apparatus other than the storage apparatus 'S1', it is determined that the virtual volume V-Vol 1 does not have a suitable configuration.

The external connection level count modification program 3320 may also refer to the permissible level count management table 3500*b* shown in FIG. 8*b* to determine whether or not the number of levels of volumes is a suitable level count. The permissible level count management table 3500*b* is configured from a tier field 3511 and a permissible level count 3512 as shown in FIG. 8*b*. The tier field 3511 stores storage tier types. The permissible level count field 3512 permits a permissible level count which corresponds to each of the storage tiers.

The external connection level count modification program 3320 refers to the external connection level count management table 3400 to acquire tiers which correspond to the virtual volume and refers to the permissible level count management table 3500*b* to acquire the permissible level count of the acquired tiers. Furthermore, the external connection level count modification program 3320 determines whether or not the current number of levels of virtual volumes satisfies the permissible level count.

For example, it can be seen from the external connection level count management table 3400 that, for the virtual volume V-Vol 1, the tier is '1' and is associated with a real volume in the same apparatus. Since it can be seen from the permissible level count management table 3500*b* that the permissible level count when the tier is '1' is 'in the same apparatus,' the external connection level count modification program 3320 is able to determine that the volume configuration of the virtual volumes V-Vol is suitable. It is also clear from the external connection level count management table 3400 that, for the virtual volume V-Vol 3, the tier is '1' and is associated with a virtual volume 'S2' which shows the second storage apparatus which is not in the same apparatus. Hence, it can be determined that the volume configuration of the virtual volume V-Vol 3 is not suitable.

In addition, if the tier is '2' in the permissible level count management table 3500*b*, 'one level in a vertical direction' is stored in the permissible level count field 3500*b*. For example, in the configuration in FIG. 6, the tier of the real volume for the first storage apparatus 1000a, the second storage apparatus 1000b, and the third storage apparatus 1000c is '1' and the tier for the fourth storage apparatus 1000d and fifth storage apparatus 1000e is '2'. In this case, for example, the second storage apparatus 1000b is an apparatus with one level in a horizontal direction relative to the first storage apparatus 1000a, and the fourth storage apparatus 1000d is an apparatus with one level in a vertical direction relative to the first storage apparatus 1000a. Therefore, the fact that the permissible level count is 'one level in a vertical direction' if the tier is '2' in the permissible level count management table 3500b indicates that, for a plurality of storage apparatuses, there may be an increase by one level in the vertical direction in the case of the configuration shown in FIG. 6.

Figures 9, 10:
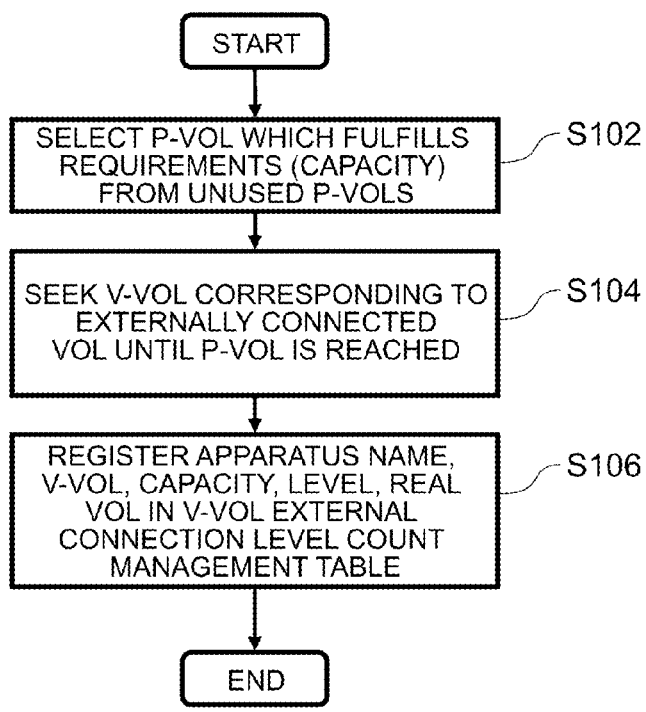
FIG. 9 is a table showing an example of a real volume unused capacity management table according to this embodiment.
FIG. 10 is a flowchart showing the flow of registration processing such as the level count according to this embodiment.

Furthermore, the real volume unused capacity management table 3600 is a table for managing the unused capacity of the real volumes stored in the storage apparatus 1000 and, as shown in FIG. 9, is configured from an apparatus name field 3601, a P-Vol field 3602, a capacity field 3603, a Tier field 3604, and an unused capacity field 3605, and the like.

The apparatus name field 3601 stores the storage names of the storage apparatuses 1000. The P-Vol field 3602 stores numbers identifying real volumes which are included in the storage apparatuses 1000. The Tier field 3604 stores the types of the storage tiers corresponding to the real volumes P-Vol. The unused capacity field 3605 stores the available unused capacities of the real volumes P-Vol.

If a real volume is added to a storage apparatus 1000, the external connection level count modification program 3320 determines whether or not data of the virtual volume with an unsuitable volume configuration can be migrated to the real volume. More specifically, the external connection level count modification program 3320 compares the capacity of the data stored in the virtual volume with the unused capacity of the real volume which is the data migration destination, and determines whether or not the data of the virtual volume can be migrated to the real volume.

(1-3) Details of Volume Configuration Management Processing in Management Computer Thereafter, the volume configuration management processing in the management computer 3000 mainly comprises processing to register the level count in the external connection level count management table 3400 by the external connection level count configuration program 3310, and processing to optimize the volume configuration of the storage apparatus 1000 by the external connection level count modification program 3320. In addition, examples of processing for optimizing the volume configuration include processing to autonomously optimize the configuration of virtual volumes with an unsuitable level count and processing for optimizing the virtual volume configuration based on a predetermined threshold designated by users. Note that it goes without saying that, although the following description of the various processing will be centered on the 'programs,' in reality it is the file storage device 3000 that executes this processing based on these 'programs.'

First, the flow of processing to register the level count through the addition of virtual volumes will be described. As shown in FIG. 10, foremost, if a virtual volume is added to a storage apparatus 1000, the external connection level count configuration program 3310 refers to the real volume unused capacity management table 3600 and selects, among the unused real volumes P-Vol, a real volume P-Vol for which the unused capacity exceeds the capacity of the added virtual volume. Further, if a real volume P-Vol of a storage apparatus other than the storage apparatus 1000 to which the virtual volume was added is selected in step S102, the external connection level count configuration program 3310 seeks virtual volumes corresponding to the externally connected volume in the apparatus providing the externally connected volume, until the real volume is reached (S104).

For example, in step S102, the virtual volume V-Vol 5 is added to the first storage apparatus 1000a and the real volume P-Vol 5 in the third storage apparatus 1000c is selected as the real volume associated with the virtual volume V-Vol 5. Further, in step S104, if a real volume P-Vol 5 is an externally connected volume, the external connection level count configuration program 3310 seeks virtual volumes corresponding to the externally connected volume in the third storage apparatus 1000c providing the externally connected volume, until the real volume P-Vol 5 is reached.

That is, the external connection level count configuration program 3310 seeks a state where the virtual volume corresponding to an externally connected volume E-Vol 4 of the virtual volume V-Vol 5 is a virtual volume V-Vol 8 of the second storage apparatus 1000b, the virtual volume corresponding to the virtual volume V-Vol 8 is the virtual volume V-Vol 9 of the third storage apparatus 1000c, and a real volume P-Vol is associated with the virtual volume V-Vol 9.

Furthermore, the external connection level count configuration program 3310 registers the apparatus name, virtual volume name (V-Vol), the virtual volume capacity, the virtual volume tier, and the real volume (real Vol) in the external connection level count management table 3400.

More specifically, the virtual volume V-Vol 1 is created in the first storage apparatus 1000a, and the real volume P-Vol 1 of the first storage apparatus 1000a is associated with the V-Vol 1. In this case, as shown in FIG. 13a, the external connection level count configuration program 3310 stores 'S1', which indicates the first storage apparatus 1000a, in the apparatus name field 3401 of the external connection level count management table 3400, stores '1', which indicates the virtual volume V-Vol 1, in the V-Vol field 3402, stores the capacity '100 G' of the virtual volume in the capacity field 3403, stores '1' in Tier field 3404, and stores the path 'P-Vol 1' to the real volume found in step S104 in the real Vol field 3405.

Furthermore, the virtual volume V-Vol 2 is created in the first storage apparatus 1000a, the virtual volume V-Vol 10 of the fourth storage apparatus 1000d is associated with V-Vol 2, and the real volume P-Vol 2 of the fourth storage apparatus 1000d is associated with V-Vol 10. In this case, as shown in FIG. 13b, the external connection level count configuration program 3310 stores 'S1', which indicates the first storage apparatus 1000a, in the apparatus name field 3401 of the external connection level count management table 3400, stores '2', which indicates the virtual volume V-Vol 2, in the V-Vol field 3402, stores the capacity '500 G' of the virtual volume in the capacity field 3403, stores '2' in Tier field 3404, and stores the path 'S4: V-Vol 10, S4: P-Vol 2' to the real volume found in step S104 in the real Vol field 3405.

Furthermore, a virtual volume V-Vol 5 is created in the first storage apparatus 1000a, the virtual volume V-Vol 8 of the second storage apparatus 1000b is associated with the V-Vol 5, the virtual volume V-Vol 9 of the third storage apparatus 1000c is associated with the V-Vol 8, and the real volume P-Vol 5 of the third storage apparatus 1000c is associated with the V-Vol 9. In this case, as shown in FIG. 13c, the external connection level count configuration program 3310 stores 'S1', which indicates the first storage apparatus 1000a, in the apparatus name field 3401 of the external connection level count management table 3400, stores '5', which indicates the virtual volume V-Vol 5, in the V-Vol field 3402, stores the capacity '100 G' of the virtual volume in the capacity field 3403, stores '1' in Tier field 3404, and stores the path 'S2: V-Vol 8, S3: V-Vol 9, S3: P-Vol 5' to the real volume found in step S104 in the real Vol field 3405.

Figure 11:
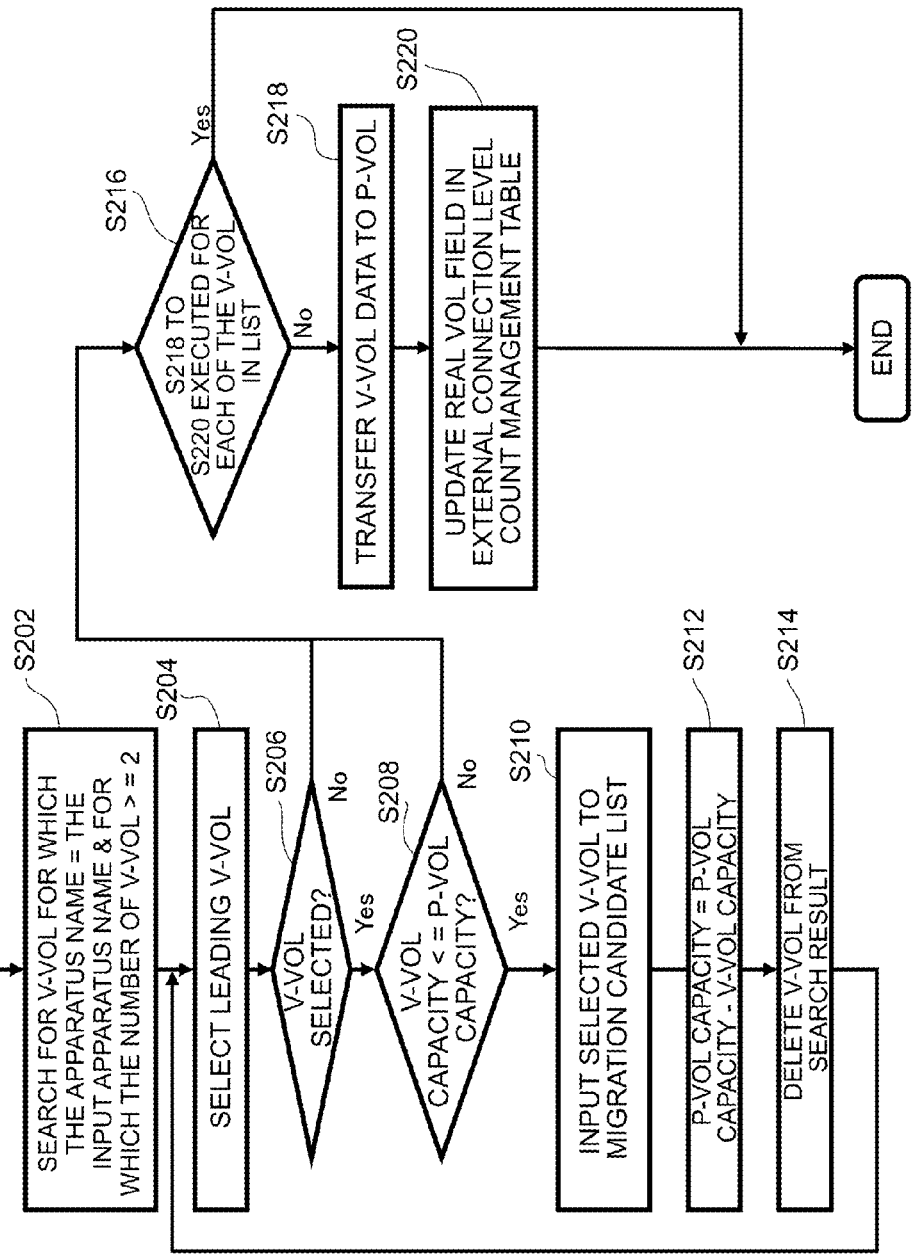
FIG. 11 is a flowchart showing optimization processing of a virtual volume configuration according to this embodiment.

Processing to optimize the configuration of the virtual volumes with an unsuitable level count will be explained next. As shown in FIG. 11, the external connection level count modification program 3320 first acquires the apparatus name of the storage apparatus 1000 to which the real volume is added, and searches the external connection level count management table 3400 for the corresponding apparatuses for which the number of virtual volumes V-Vol is two or more (S202). The external connection level count modification program 3320 may search the external connection level count management table 3400 in step S202 for virtual volumes for which the number of virtual volumes V-Vol is two or more by sorting the tier values in ascending order and the level count values in descending order.

The external connection level count modification program 3320 selects the leading virtual volume V-Vol in the external connection level count management table 3400 sorted in step S202 (S204). Furthermore, in step S204, the external connection level count modification program 3320 determines whether or not it has been possible to select the leading V-Vol (S206). If it is determined in step S206 that it has been possible to select the leading V-Vol, the external connection level count modification program 3320 executes the processing of step S208. If, on the other hand, it is determined in step S206 that it has not been possible to select the leading V-Vol, or in other words that there are no virtual volumes V-Vol for which the number of virtual volumes V-Vol is two or more, the external connection level count modification program 3320 executes the processing of step S216.

Furthermore, the external connection level count modification program 3320 determines whether or not the capacity of the virtual volume V-Vol selected in step S204 is equal to or less than the capacity of the real volume P-Vol added (S208). If it is determined in step S208 that the capacity of the virtual volume V-Vol is equal to or less than the capacity of the added real volume P-Vol, the external connection level count modification program 3320 executes the processing of step S210. If, on the other hand, it is determined in step S208 that the capacity of the virtual volume V-Vol is greater than the capacity of the added real volume P-Vol, the external connection level count modification program 3320 executes the processing of step S216.

Furthermore, the external connection level count modification program 3320 adds the selected virtual volume V-Vol to the migration candidate list (S210). The external connection level count modification program 3320 then updates the real volume unused capacity management table 3600 where a value, which is obtained by subtracting the capacity of the virtual volume V-Vol from the capacity of the real volume P-Vol is taken as the P-Vol unused capacity (S212). Furthermore, the external connection level count modification program 3320 then deletes the virtual volume V-Vol added to the migration candidate list in step S210 from the search result resulting from the search in step S202 (S214). The external connection level count modification program 3320 repeats the processing of step S204 and subsequent steps after the processing of step S214.

Furthermore, the external connection level count modification program 3320 determines, in step S216, whether or not the processing of steps S218 to S220 has been executed for each of the virtual volumes V-Vol in the migration candidate list added in step S210 (S216). The external connection level count modification program 3320 terminates the processing if it is determined, in step S216, that the processing of steps S218 to S220 has been executed for all of the virtual volumes V-Vol in the migration candidate list.

If, on the other hand, it is determined in step S216 that the processing of steps S218 to S220 has not been executed for all of the virtual volumes V-Vol in the migration candidate list, the external connection level count modification program 3320 migrates data of one virtual volume V-Vol in the list to the real volume P-Vol (S218). Furthermore, the external connection level count modification program 3320 updates the real Vol field 3405 of the external connection level count management table 3400 (S220).

Figure 12:
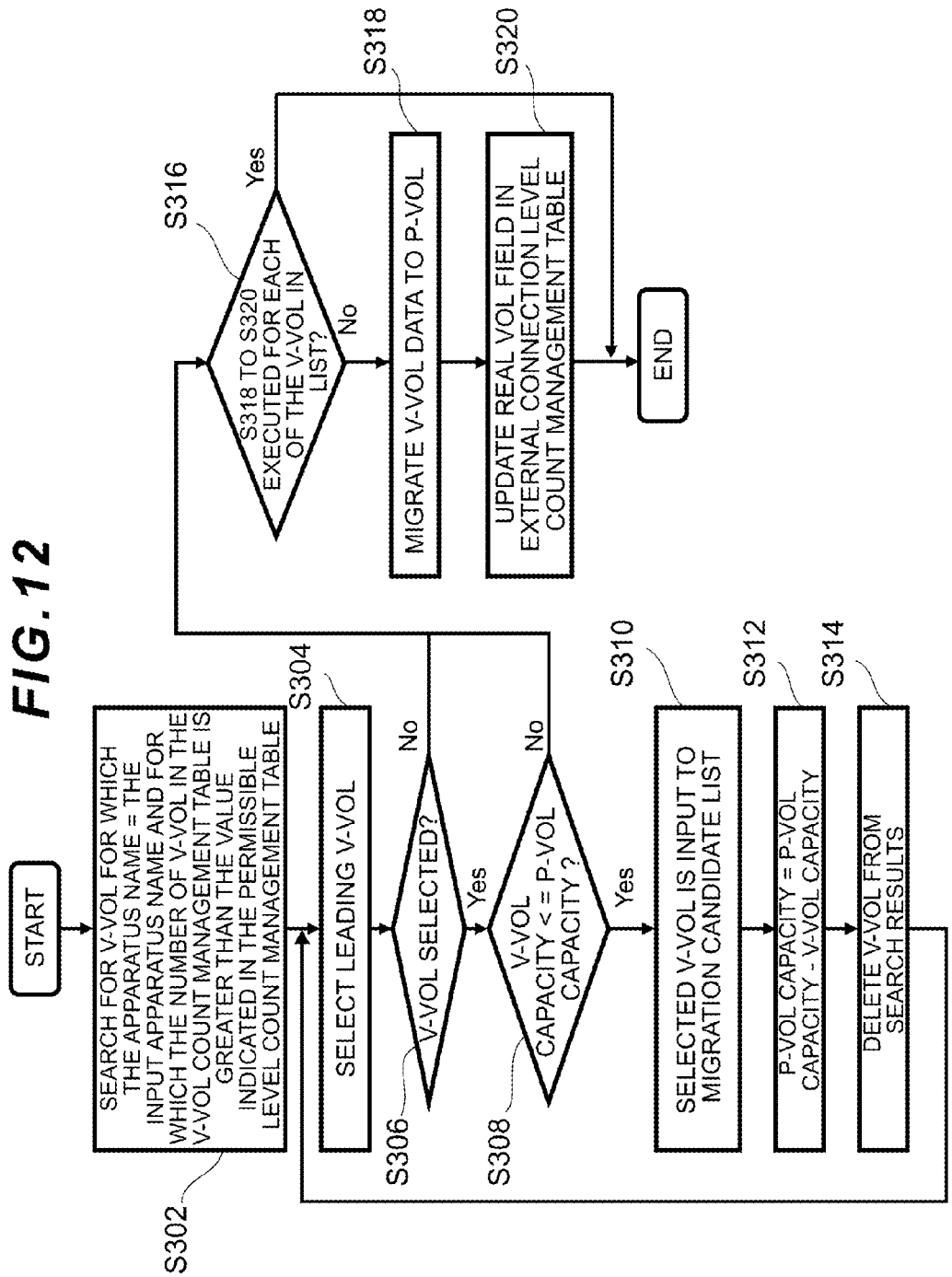
FIG. 12 is a flowchart showing the optimization processing of the virtual volume configuration according to this embodiment.

Processing to optimize the configuration of the virtual volumes on the basis of a predetermined threshold designated by the user will be explained next. As shown in FIG. 12, the external connection level count modification program 3320 acquires the apparatus names of the storage apparatuses 1000 to which the real volumes are added and searches for the virtual volumes V-Vol for which the number in the level count of the corresponding apparatus name in the external connection level count management table 3400 is greater than the value shown in the permissible level count management table 3500 (S302).

The external connection level count modification program 3320 then selects the leading virtual volume V-Vol in the external connection level count management table 3400 searched for in step S302 (S304). Furthermore, in step S304, the external connection level count modification program 3320 determines whether or not it has been possible to select the leading V-Vol (S306). If it is determined in step S306 that it has been possible to select the leading V-Vol, the external connection level count modification program 3320 executes the processing of step S308. If, on the other hand, it is determined in step S306 that it has not been possible to select the leading V-Vol, the external connection level count modification program 3320 executes the processing of step S316.

Furthermore, the external connection level count modification program 3320 determines whether or not the capacity of the virtual volume V-Vol selected in step S304 is equal to or less than the capacity of the real volume P-Vol added (S308). If it is determined in step S308 that the capacity of the virtual volume V-Vol is equal to or less than the capacity of the added real volume P-Vol, the external connection level count modification program 3320 executes the processing of step S310. If, on the other hand, it is determined in step S308 that the capacity of the virtual volume V-Vol is greater than the capacity of the added real volume P-Vol, the external connection level count modification program 3320 executes the processing of step S316.

The external connection level count modification program 3320 then adds the selected virtual volume V-Vol to the migration candidate list (S310). The external connection level count modification program 3320 then updates the real volume unused capacity management table 3600 where a value, which is obtained by subtracting the capacity of the virtual volume V-Vol from the capacity of the real volume P-Vol, is taken as the P-Vol unused capacity (S312). Furthermore, the external connection level count modification program 3320 then deletes the virtual volume V-Vol added to the migration candidate list in step S310 from the search result resulting from the search in step S302 (S314). The external connection level count modification program 3320 repeats the processing of step S304 and subsequent steps after the processing of step S314.

Furthermore, the external connection level count modification program 3320 determines, in step S316, whether or not the processing of steps S318 to S320 has been executed for each of the virtual volumes V-Vol in the migration candidate list added in step S310 (S316). The external connection level count modification program 3320 terminates the processing if it is determined, in step S316, that the processing of steps S318 to S320 has been executed for all of the virtual volumes V-Vol in the migration candidate list.

If, on the other hand, it is determined in step S316 that the processing of steps S318 to S320 has not been executed for all of the virtual volumes V-Vol in the migration candidate list, the external connection level count modification program 3320 migrates data of one virtual volume V-Vol in the list to the real volume P-Vol (S318). Furthermore, the external connection level count modification program 3320 updates the real Vol field 3405 of the external connection level count management table 3400 (S320).

A specific example of the external connection level count management table 3400 which is updated by the optimization processing of the volume configuration above will be explained next. For example, suppose that a real volume P-Vol with a capacity of 100 G and tier '1' is added to the first storage apparatus 1000a with the volume configuration shown in FIG. 6. In this case, the external connection level count modification program 3320 optimizes the volume configuration of the first storage apparatus 1000a by means of the volume configuration optimization processing. In other words, volume configurations are modified so that, among the virtual volume V-Vol configurations shown in the external connection level count management table 3400 shown in FIG. 7, the level counts of the virtual volumes V-Vol 3 and V-Vol 5 for which tier is '1' and a volume configuration is unsuitable are minimized.

Figure 14:
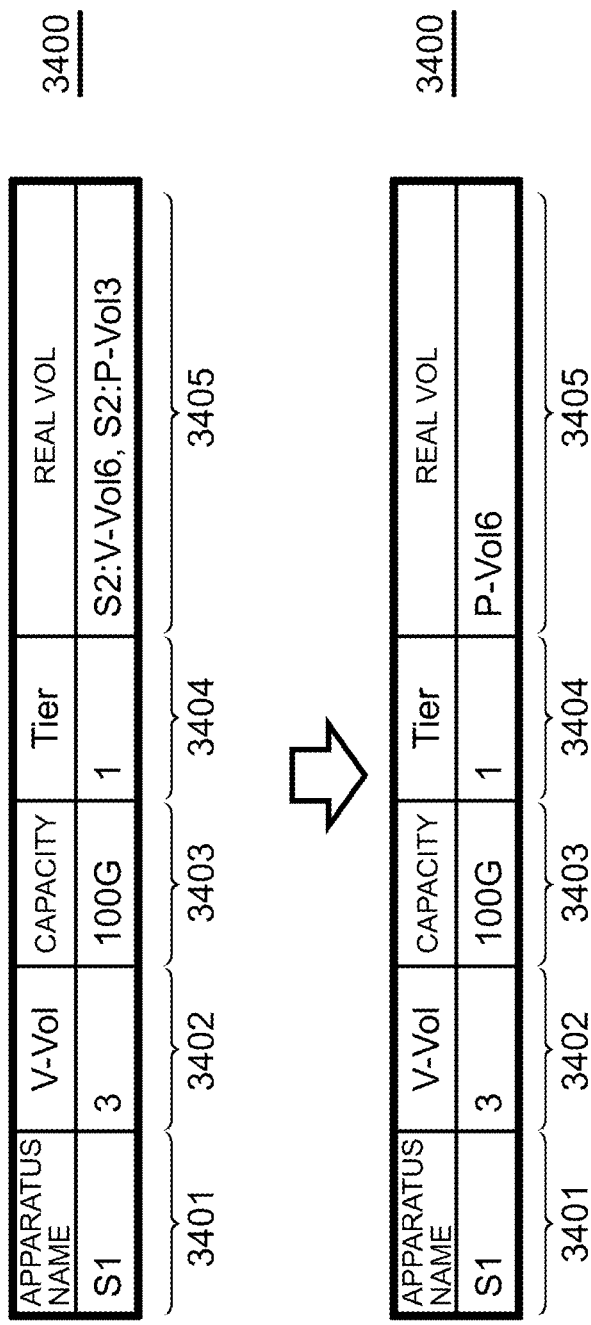
FIG. 14 is a table showing an example of an external connection level count management table according to this embodiment.

For example, as shown in FIG. 14, in the external connection level count management table 3400, the virtual volume V-Vol '3' in the first storage apparatus 'S1' is tier '1' but is associated with the virtual volume V-Vol of the second storage apparatus 'S2' and there are two levels. The external connection level count modification program 3320 therefore migrates data stored in the virtual volume V-Vol 3 to a newly added real volume P-Vol 6 and stores the 'P-Vol 6' to the real volume field 3405.

Figure 15:
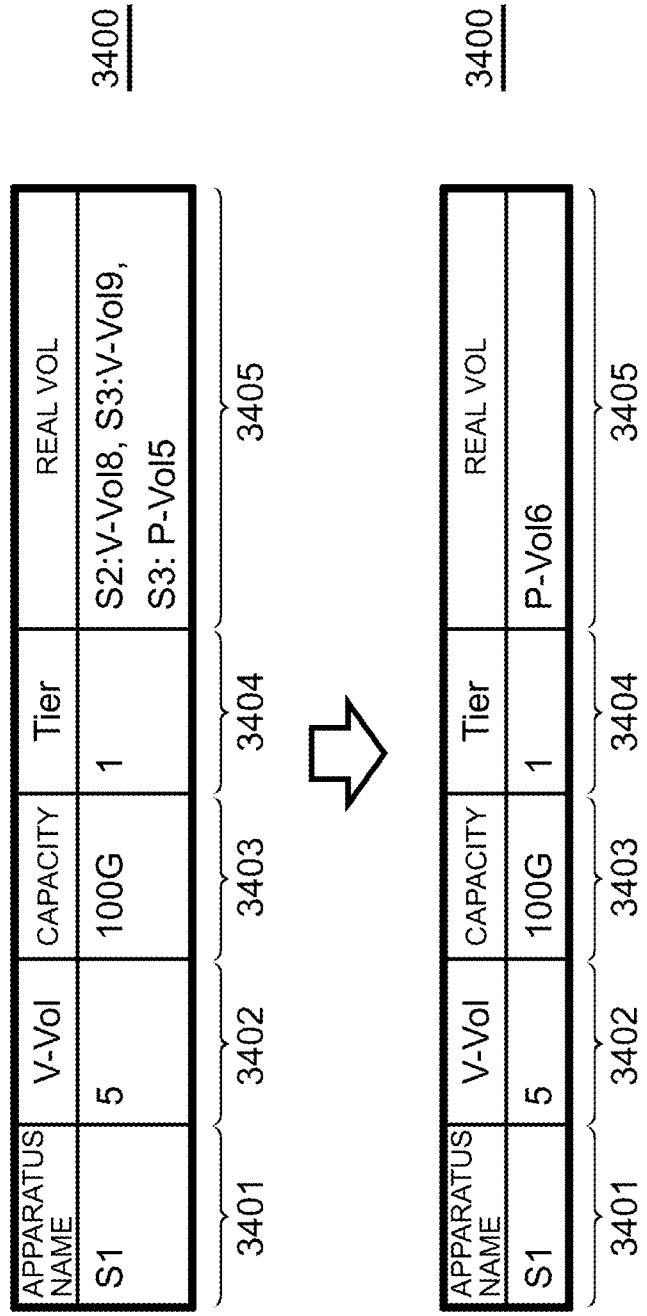
FIG. 15 is a table showing an example of an external connection level count management table according to this embodiment.

In addition, as shown in FIG. 15, in the external connection level count management table 3400, the virtual volume V-Vol '5' in the first storage apparatus 'S1' is tier '1' but is associated with the virtual volume V-Vol 9 of the third storage apparatus 'S3' via the virtual volume V-Vol 8 of the second storage apparatus 'S2', resulting in three levels. The external connection level count modification program 3320 therefore migrates data stored in the virtual volume V-Vol 5 to a newly added real volume P-Vol 6 and stores the 'P-Vol 6' to the real volume field 3405.

Thus, volume configuration can be optimized so that the level count is '1' for virtual volumes of tier '1' by means of volume configuration optimization processing by the external connection level count modification program 3320.

In addition, for example, suppose that a real volume P-Vol 7 with a capacity of 100 G and for which the tier is '1' is added to the second storage apparatus 1000b. In this case, the external connection level count modification program 3320 uses the real volume P-Vol 7 added to the second storage apparatus 1000b by means of the volume configuration optimization processing to optimize the volume configuration of the virtual volume V-Vol 5 where the number of levels is three.

Figure 16:
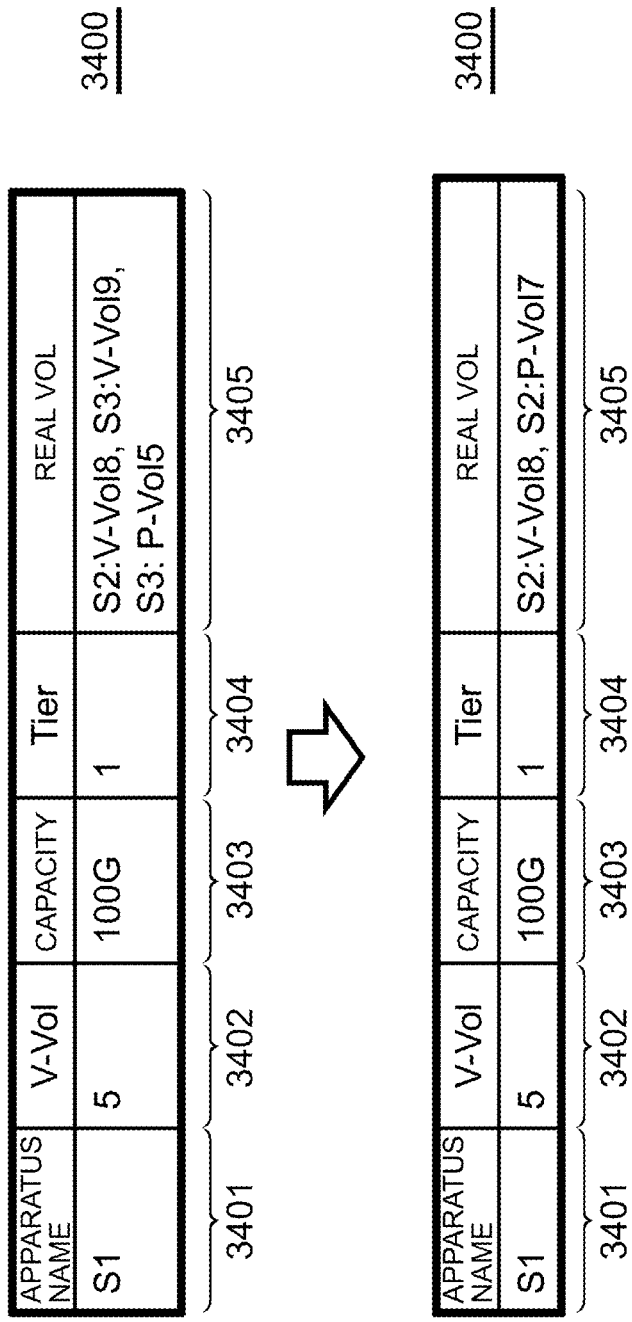
FIG. 16 is a table showing an example of an external connection level count management table according to this embodiment.

Specifically, as shown in FIG. 16, in the external connection level count management table 3400, the virtual volume V-Vol '5' in the first storage apparatus 'S1' has '3' levels. The external connection level count modification program 3320 therefore migrates data stored in the virtual volume V-Vol 5 to a newly added real volume P-Vol 7 and associates the newly added real volume P-Vol 7 with the virtual volume V-Vol 8 of the second storage apparatus 'S2'. The external connection level count modification program 3320 then stores 'S2: V-Vol 8, S2: P-Vol 7' in the real volume field 3405 in the external connection level count management table 3400.

In addition, for example, suppose that a real volume P-Vol 8 with a capacity of 500 G and for which tier is '2' is added to the fourth storage apparatus 1000d. In this case, the external connection level count modification program 3320 uses the real volume P-Vol 8 added to the fourth storage apparatus 1000d by means of the volume configuration optimization processing to optimize the volume configuration of the virtual volume V-Vol 4 where the number of levels is three.

Specifically, as shown in FIG. 17, in the external connection level count management table 3400, the virtual volume V-Vol '4' in the first storage apparatus 'S1' has '3' levels. The external connection level count modification program 3320 then migrates data stored in the virtual volume V-Vol 4 to a newly added real volume P-Vol 8 and associates the newly added real volume P-Vol 8 with the virtual volume V-Vol 12 of the fourth storage apparatus 'S4'. The external connection level count modification program 3320 then stores 'S4: V-Vol 2, S4: P-Vol 18' in the real volume field 3405 in the external connection level count management table 3400.

(1-4) Effect of the Embodiment

As described hereinabove, in the computer system according to this embodiment, the management computer 3000 registers the volume configuration of the plurality of storage apparatuses 1000 in the external connection level count management table 3400 and if a real volume is added to the storage apparatus 1000, updates the volume configuration to create an optimized volume configuration and updates the external connection level count management table 3400. More specifically, the external connection level count modification program 3320 manages, as a 'level count', the configuration up to and including apparatuses with real volumes associated with the virtual volumes of the storage apparatus 1000, and modifies the volume configuration so that the 'level count' is an optimum number. Consequently, the management man-hours for volume configuration by the system administrator can be reduced by optimizing the configuration of the volumes provided by means of an external connection.

(2) Second Embodiment

A computer system 2 according to a second embodiment is configured similarly to the computer system 1 according to the first embodiment in terms of its computer system hardware configuration and the hardware configuration of each apparatus; however, part of the virtual volume configuration management is different. Hereinbelow points which differ from the first embodiment will be described in particular detail, while a detailed description of configurations which are the same as the first embodiment is omitted.

More specifically, this embodiment differs from the first embodiment in that the level count up to and including apparatuses with real volumes associated with a virtual volume is directly managed by the external connection level count management table. As shown in FIG. 18, the external connection level count management table 4400 according to this embodiment comprises a level count field 4450 which stores the level counts corresponding to each of the virtual volumes V-Vol. Furthermore, the real volume field 4406 stores information of the real volume P-Vol associated with each virtual volume V-Vol or of virtual volumes V-Vol in the same apparatus as the real volume P-Vol.

Figure 19:
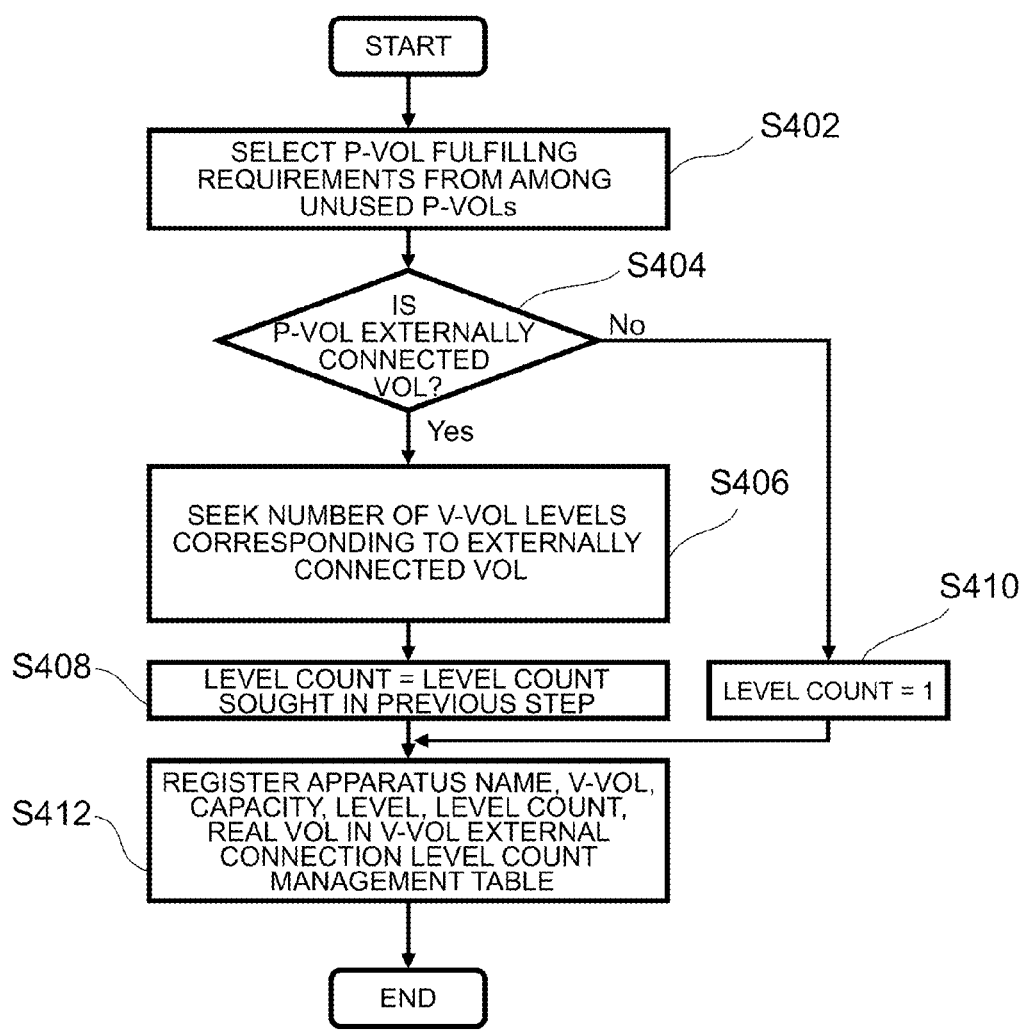
FIG. 19 is a flowchart showing the flow of registration processing such as the level count according to a second embodiment.

First, the flow of processing to register the level count as a result of the addition of virtual volumes will be described. As shown in FIG. 19, foremost, if a virtual volume is added to a storage apparatus 1000, the external connection level count configuration program 3310 refers to the real volume unused capacity management table 3600 and selects, among the unused real volumes P-Vol, a real volume P-Vol for which the unused capacity exceeds the capacity of the added virtual volume.

Furthermore, the external connection level count configuration program 3310 determines whether or not the real volume P-Vol selected in step S402 is an externally connected volume (S404). More specifically, the external connection level count configuration program 3310 determines whether or not the real volume P-Vol is an externally connected volume depending on whether the real volume P-Vol is within the same apparatus as the virtual volume.

Furthermore, if it is determined in step S404 that the real volume P-Vol is not an externally connected volume, the external connection level count configuration program 3310 stores the level count corresponding to the virtual volume as '1' (S410).

If, on the other hand, it is determined in step S404 that the real volume P-Vol is an externally connected volume, the external connection level count configuration program 3310 seeks the level count of the virtual volume V-Vol corresponding to the externally connected volume (S406). More specifically, the external connection level count configuration program 3310 seeks the number of apparatuses up to and including the virtual volume corresponding to the externally connected volume in the apparatus providing the externally connected volume, and takes the number of the apparatuses as the level count.

Furthermore, the external connection level count configuration program 3310 stores the level count determined in step S406 in the parameter 'level count' (S408). Furthermore, the external connection level count configuration program 3310 registers the apparatus name, the virtual volume name (V-Vol), the virtual volume tier, the virtual volume capacity, the level count, and the real volume (real Vol) in the external connection level count management table 3400 (S412).

Figure 22:
FIG. 22 is a table showing an example of an external connection level count management table according to this embodiment.

More specifically, the virtual volume V-Vol 1 is created in the first storage apparatus 1000*a*, and the real volume P-Vol 1 of the first storage apparatus 1000*a* is associated with the V-Vol 1. In this case, as shown in FIG. 22, the external connection level count configuration program 3310 stores 'S1', which indicates the first storage apparatus 1000*a*, in the apparatus name field 4401 of the external connection level count management table 4400, stores '1', which indicates the virtual volume V-Vol 1, in the V-Vol field 4402, stores the capacity '100 G' of the virtual volume in the capacity field 4403, stores '1' in tier field 4404, stores '1', which was determined in step S406, in the level count field 4405, and stores the real volume P-Vol 1 in the real Vol field 4405.

Figure 23:
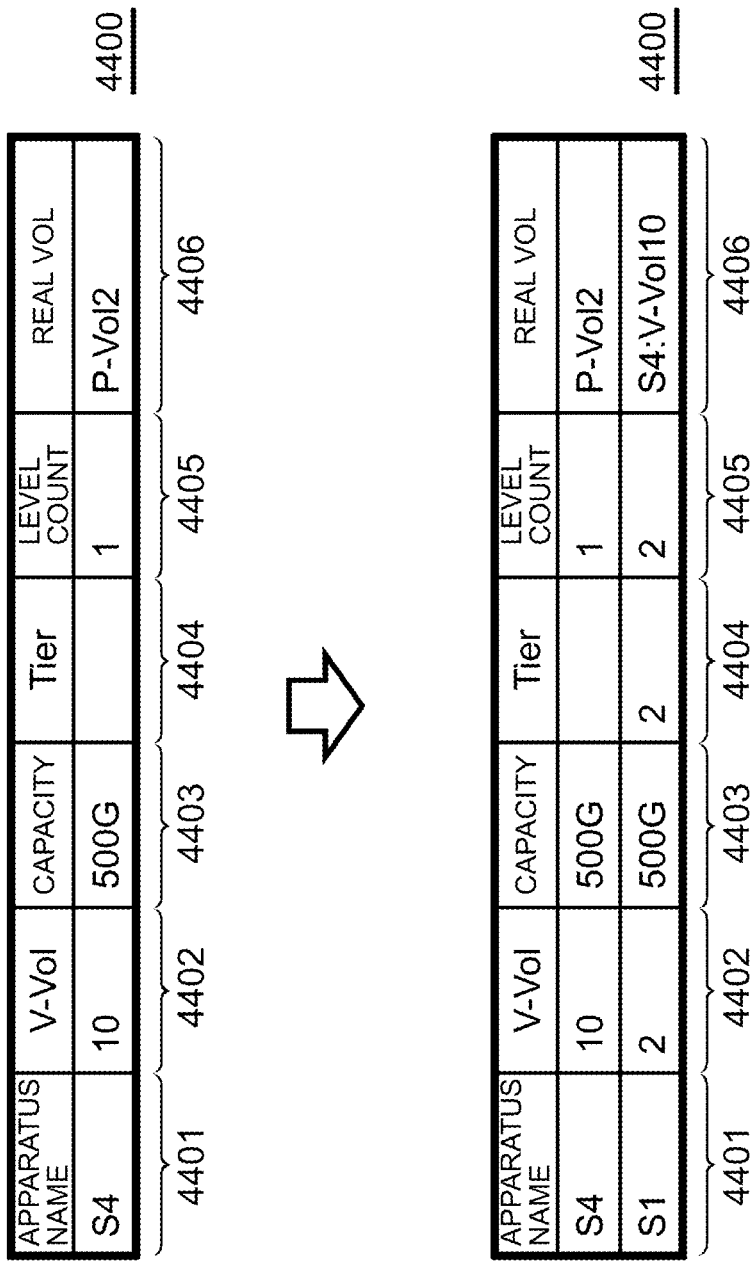
FIG. 23 is a table showing an example of an external connection level count management table according to this embodiment.

Furthermore, the virtual volume V-Vol 2 is created in the first storage apparatus 1000*a*, the virtual volume V-Vol 10 of the fourth storage apparatus 1000*d* is associated with V-Vol 2, and the real volume P-Vol 2 of the fourth storage apparatus 1000*d* is associated with V-Vol 10. In this case, as shown in FIG. 23, the external connection level count configuration program 3310 stores 'S1', which indicates the first storage apparatus 1000*a*, in the apparatus name field 4401 of the external connection level count management table 4400, stores '2', which indicates the virtual volume V-Vol 2, in the V-Vol field 4402, stores the capacity '500 G' of the virtual volume in the capacity field 4403, stores '2' in tier field 4404, stores the level count '2', which was determined in step S406, in the level count field 4405, and stores 'S4: V-Vol 10' in the real Vol field 4405. The real Vol field 4405 may store the apparatus name and the virtual volume name of the virtual volume V-Vol 10 in the same apparatus as the real volume P-Vol 2.

Furthermore, a virtual volume V-Vol 5 is created in the first storage apparatus 1000*a*, the virtual volume V-Vol 8 of the second storage apparatus 1000*b* is associated with the V-Vol 5, the virtual volume V-Vol 9 of the third storage apparatus 1000*c* is associated with the V-Vol 8, and the real volume P-Vol 5 of the third storage apparatus 1000*c* is associated with the V-Vol 9. In this case, as shown in FIG. 24, the external connection level count configuration program 3310 stores 'S1', which indicates the first storage apparatus 1000*a*, in the apparatus name field 4401 of the external connection level count management table 4400, stores '5', which indicates the virtual volume V-Vol 5, in the V-Vol field 4402, stores the capacity '100 G' of the virtual volume in the capacity field 4403, stores '1' in the tier field 4404, stores the level count '3' determined in step S406 in the level count field 4405, and stores 'S2: V-Vol 8' in the real Vol field 4405.

Figure 20:
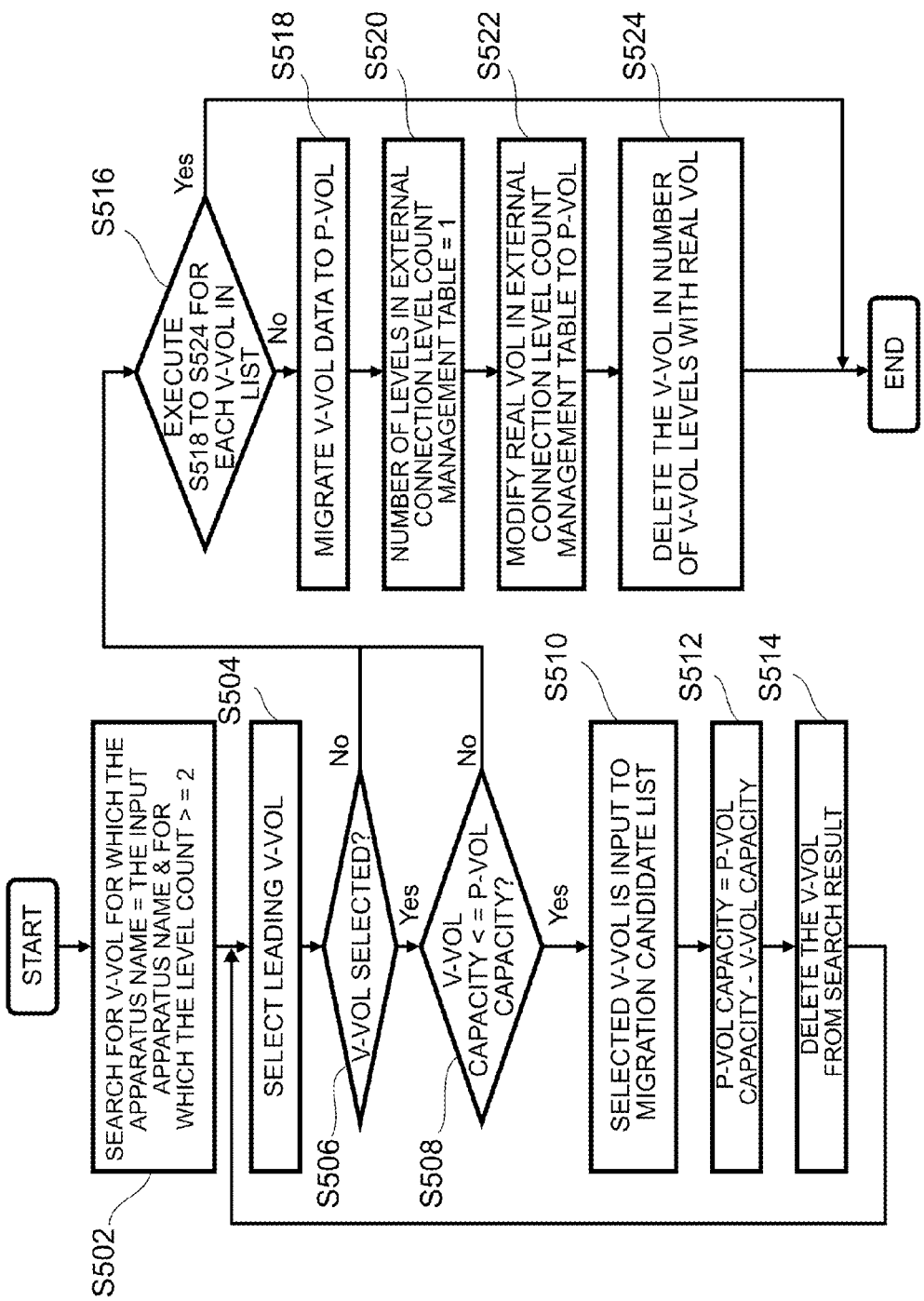
FIG. 20 is a flowchart showing the optimization processing of the virtual volume configuration according to this embodiment.

Processing to optimize the configuration of virtual volumes with an unsuitable level count will be explained next. As shown in FIG. 20, the external connection level count modification program 3320 first acquires the apparatus name of the storage apparatus 1000 to which the real volume is added, and searches the external connection level count management table 4400 for the corresponding apparatuses for which the number of virtual volumes V-Vol is two or more (S502). The external connection level count modification program 3320 may search the external connection level count management table 4400 in step S502 for virtual volumes for which the level count is two or more by sorting the tier values in ascending order and the level count values in descending order.

The external connection level count modification program 3320 then selects the leading virtual volume V-Vol in the external connection level count management table 4400 sorted in step S502 (S504). Furthermore, in step S504, the external connection level count modification program 3320 determines whether or not it has been possible to select the leading V-Vol (S506). If it is determined in step S506 that it has been possible to select the leading V-Vol, the external connection level count modification program 3320 executes the processing of step S508. If, on the other hand, it is determined in step S506 that it has not been possible to select the leading V-Vol, or in other words that there are no virtual volumes V-Vol with a level count of two or more, the external connection level count modification program 3320 executes the processing of step S516.

Furthermore, the external connection level count modification program 3320 determines whether or not the capacity of the virtual volume V-Vol selected in step S504 is equal to or less than the capacity of the real volume P-Vol added (S508). If it is determined in step S508 that the capacity of the virtual volume V-Vol is equal to or less than the capacity of the added real volume P-Vol, the external connection level count modification program 3320 executes the processing of step S510. If, on the other hand, it is determined in step S508 that the capacity of the virtual volume V-Vol is greater than the capacity of the added real volume P-Vol, the external connection level count modification program 3320 executes the processing of step S516.

Furthermore, the external connection level count modification program 3320 adds the selected virtual volume V-Vol to the migration candidate list (S510). The external connection level count modification program 3320 then updates the real volume unused capacity management table 3600 where a value, which is obtained by subtracting the capacity of the virtual volume V-Vol from the capacity of the real volume P-Vol, is taken as the P-Vol unused capacity (S512). Furthermore, the external connection level count modification program 3320 then deletes the virtual volume V-Vol added to the migration candidate list in step S210 from the search result resulting from the search in step S202 (S514). The external connection level count modification program 3320 repeats the processing of step S504 and subsequent steps after the processing of step S514.

Furthermore, the external connection level count modification program 3320 determines, in step S516, whether or not the processing of steps S518 to S524 has been executed for each of the virtual volumes V-Vol in the migration candidate list added in step S510 (S516). The external connection level count modification program 3320 terminates the processing if it is determined, in step S516, that the processing of steps S518 to S524 has been executed for all of the virtual volumes V-Vol in the migration candidate list.

If, on the other hand, it is determined in step S516 that the processing of steps S518 to S524 has not been executed for all of the virtual volumes V-Vol in the migration candidate list, the external connection level count modification program 3320 migrates data of one virtual volume V-Vol in the list to the real volume P-Vol (S518). Furthermore, the external connection level count modification program 3320 stores '1' in the external connection level count management table 4400 (S520).

The external connection level count modification program 3320 then stores the real volume P-Vol in the real Vol field 4405 (S522). In addition, the level count of the virtual volumes for which a virtual volume to which data was migrated in step S518 is taken as a real volume is reduced by one (S524).

Figure 21:
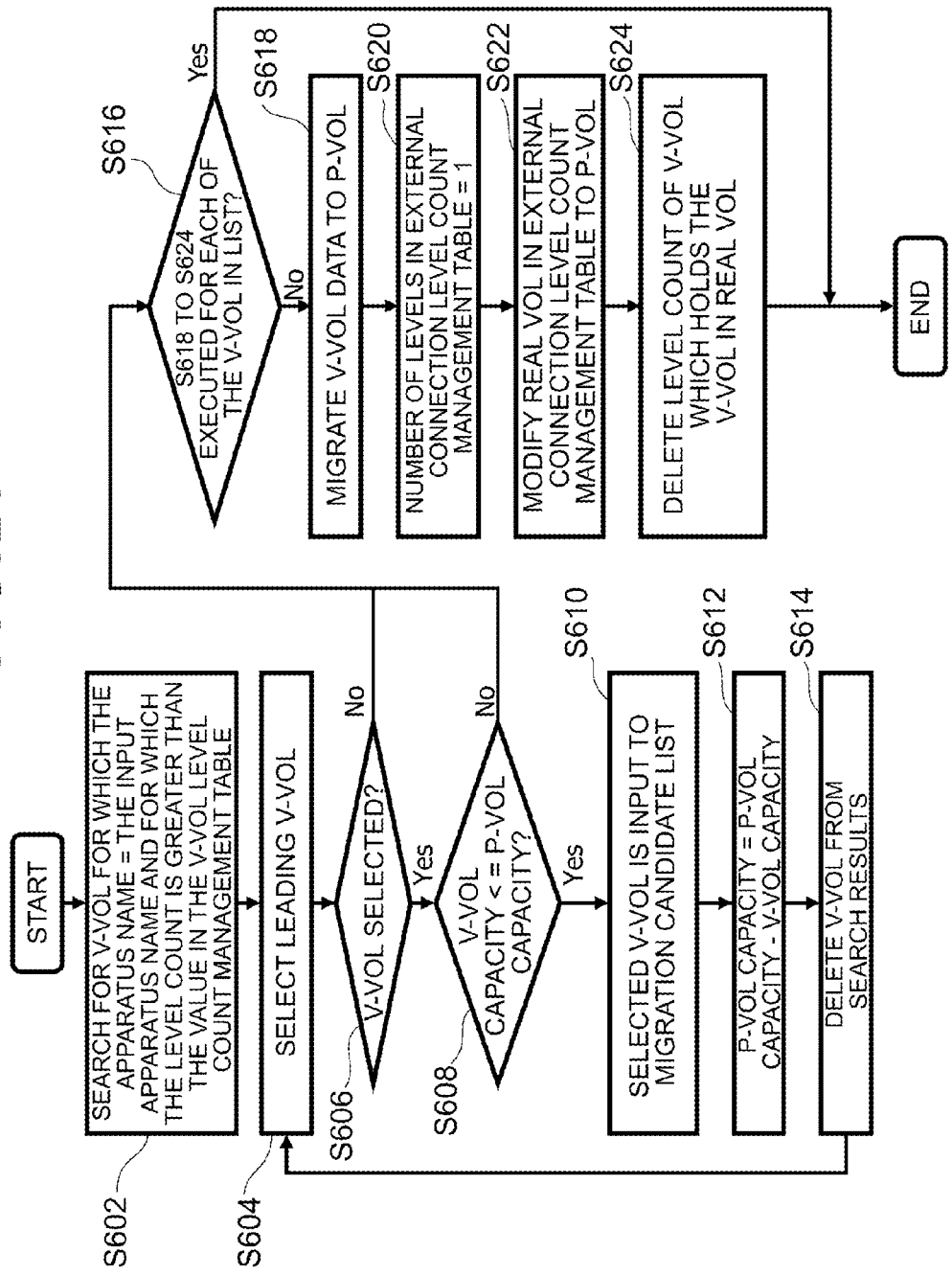
FIG. 21 is a flowchart showing the optimization processing of the virtual volume configuration according to this embodiment.

Processing to optimize the configuration of the virtual volumes on the basis of a predetermined threshold designated by the user will be explained next. As shown in FIG. 21, the external connection level count modification program 3320 acquires the apparatus names of the storage apparatuses 1000 to which the real volumes are added and searches for the virtual volumes V-Vol for which the number in the level count of the corresponding apparatus name in the external connection level count management table 4400 is greater than the value shown in the permissible level count management table 3500 (S602).

The external connection level count modification program 3320 then selects the leading virtual volume V-Vol in the external connection level count management table 3400 searched for in step S302 (S604). Furthermore, in step S604, the external connection level count modification program 3320 determines whether or not it has been possible to select the leading V-Vol (S606). If it is determined in step S606 that it has been possible to select the leading V-Vol, the external connection level count modification program 3320 executes the processing of step S608. If, on the other hand, it is determined in step S606 that it has not been possible to select the leading V-Vol, the external connection level count modification program 3320 executes the processing of step S616.

Furthermore, the external connection level count modification program 3320 determines whether or not the capacity of the virtual volume V-Vol selected in step S604 is equal to or less than the capacity of the real volume P-Vol added (S608).

If it is determined in step S608 that the capacity of the virtual volume V-Vol is equal to or less than the capacity of the added real volume P-Vol, the external connection level count modification program 3320 executes the processing of step S610. If, on the other hand, it is determined in step S608 that the capacity of the virtual volume V-Vol is greater than the capacity of the added real volume P-Vol, the external connection level count modification program 3320 executes the processing of step S616.

Furthermore, the external connection level count modification program 3320 adds the selected virtual volume V-Vol to the migration candidate list (S610). The external connection level count modification program 3320 then updates the real volume unused capacity management table 3600 where a value, which is obtained by subtracting the capacity of the virtual volume V-Vol from the capacity of the real volume P-Vol, is taken as the P-Vol unused capacity (S612). Furthermore, the external connection level count modification program 3320 then deletes the virtual volume V-Vol added to the migration candidate list in step S610 from the search result resulting from the search in step S602 (S614). The external connection level count modification program 3320 repeats the processing of step S604 and subsequent steps after the processing of step S614.

Furthermore, the external connection level count modification program 3320 determines, in step S616, whether or not the processing of steps S618 to S624 has been executed for each of the virtual volumes V-Vol in the migration candidate list added in step S610 (S616). The external connection level count modification program 3320 terminates the processing if it is determined, in step S616, that the processing of steps S618 to S624 has been executed for all of the virtual volumes V-Vol in the migration candidate list.

If, on the other hand, it is determined in step S616 that the processing of steps S618 to S620 has not been executed for all of the virtual volumes V-Vol in the migration candidate list, the external connection level count modification program 3320 migrates data of one virtual volume V-Vol in the list to the real volume P-Vol (S618). Furthermore, the external connection level count modification program 3320 updates the level count field 4405 of the external connection level count management table 4400 (S620).

The external connection level count modification program 3320 then stores the real volume P-Vol in the real Vol field 4405 (S622). In addition, the level count of the virtual volumes for which a virtual volume to which data was migrated in step S608 is taken as a real volume is reduced by one (S624).

A specific example of the external connection level count management table 4400 which is updated by the optimization processing of the volume configuration above will be explained next. For example, suppose that a real volume P-Vol 6 with a capacity of 100 G and tier '1' is added to the first storage apparatus 1000*a* with the volume configuration shown in FIG. 6. In this case, the external connection level count modification program 3320 optimizes the volume configuration of the first storage apparatus 1000*a* by means of the volume configuration optimization processing. In other words, volume configurations are modified so that, among the virtual volume V-Vol configurations shown in the external connection level count management table 4400 shown in FIG. 18, the level counts of the virtual volumes with tier '1' and an unsuitable volume configuration are minimized.

Figure 25:
FIG. 25 is a table showing an example of an external connection level count management table according to this embodiment.

For example, as shown in FIG. 25, although the virtual volume V-Vol '3' in the first storage apparatus is tier '1' in the external connection level count management table 4400, the level count is then two. The external connection level count modification program 3320 then migrates data stored in the virtual volume V-Vol 3 to a newly added real volume P-Vol 6, updates the level count field 4405 to '1', and stores the 'P-Vol 6' in the real volume field 4406.

In addition, as shown in FIG. 26, in the external connection level count management table 4400, the virtual volume V-Vol '5' in the first storage apparatus 'S1' is tier '1' but the level count is then three. The external connection level count modification program 3320 therefore migrates data stored in the virtual volume V-Vol 5 to the newly added real volume P-Vol 6, changes the level count field 4405 to '1', and stores the 'P-Vol 6' in the real volume field 4406.

Thus, volume configuration can be optimized so that the level count is '1' for virtual volumes for which the tier is '1' by means of volume configuration optimization processing by the external connection level count modification program 3320.

In addition, for example, suppose that a real volume P-Vol 7 with a capacity of 100 G and for which the tier is '1' is added to the second storage apparatus 1000*b*. In this case, the external connection level count modification program 3320 uses the real volume P-Vol 7 added to the second storage apparatus 1000*b* by means of the volume configuration optimization processing to optimize the volume configuration of the virtual volume V-Vol 5 where the number of levels is three.

Specifically, as shown in FIG. 27, in the external connection level count management table 4400, the virtual volume V-Vol '5' in the first storage apparatus 'S1' has '3' levels. The external connection level count modification program 3320 therefore migrates data stored in the virtual volume V-Vol 5 to a newly added real volume P-Vol 7 and associates the newly added real volume P-Vol 7 with the virtual volume V-Vol 8 of the second storage apparatus 'S2'. The external connection level count modification program 3320 then modifies the level count field 4405 of the external connection level count management table 4400 to '2' and stores 'S2: V-Vol 8' in the real volume field 4405. In addition, since the real volume P-Vol 7 is associated with the second storage apparatus 'S2', the level count field 4405 of the virtual volume V-Vol '8' is changed to '1' and 'P-Vol 7' is stored in the real volume field 4406.

In addition, for example, suppose that a real volume P-Vol 8 with a capacity of 500 G and for which the tier is '2' is added to the fourth storage apparatus 1000*d*. In this case, the external connection level count modification program 3320 uses the real volume P-Vol 8 added to the fourth storage apparatus 1000*d* by means of the volume configuration optimization processing to optimize the volume configuration of the virtual volume V-Vol 4 where the number of levels is three.

Specifically, as shown in FIG. 28, in the external connection level count management table 4400, the virtual volume V-Vol '4' in the first storage apparatus 'S1' has '3' levels. The external connection level count modification program 3320 then migrates data stored in the virtual volume V-Vol 4 to a newly added real volume P-Vol 8 and associates the newly added real volume P-Vol 8 with the virtual volume V-Vol 12 of the fourth storage apparatus 'S4'. The external connection level count modification program 3320 then modifies the level count field 4405 in the external connection level count management table 4400 to '2' and stores 'S4: V-Vol 12' in the real volume field 4406. In addition, since the real volume P-Vol 8 is associated with the fourth storage apparatus 'S4', the apparatus name 'S4', the virtual volume V-Vol '12', the capacity '500 G', the level count '1', and the real Vol 'P-Vol 8' are added to the external connection level count management table 4400.

(2-4) Effect of the Embodiment

As described hereinabove, in the computer system according to this embodiment, the management computer 3000 registers the volume configuration of the plurality of storage apparatuses 1000 in the external connection level count management table 4400 and if the real volume is added to the storage apparatus 1000, updates the volume configuration to create an optimized volume configuration and updates the external connection level count management table 4400. More specifically, the external connection level count modification program 3320 manages, as a 'level count', the configuration up to and including apparatuses with real volumes associated with the virtual volumes of the storage apparatus 1000, and modifies the volume configuration so that the 'level count' is an optimum number. Consequently, the management man-hours for volume configuration by the system administrator can be reduced by optimizing the configuration of the volumes provided by means of an external connection.

(3) Other Embodiments

Note that in the aforementioned embodiments, based on the various programs stored in the management computer 3000, the control device 3010 of the management computer 3000 implements various functions such as a detection unit and modification unit of the present invention but is not limited to this example. For example, the control device 3010 may be provided in another separate apparatus from the management computer 3000 and be configured to implement various functions in co-operation with the control device 3010. In addition, various programs stored in the management computer 3000 may be provided in another separate device from the management computer 3000 and these programs may be configured to implement various functions as a result of being called by the control device 3010.

Furthermore, for example, each of the steps in the processing of the management computer 3000 of this specification need not necessarily be processed in chronological order according to the sequence described as a flowchart. That is, each of the steps in the processing of the management computer 3000 and the like may be executed in parallel even as different processes.

Furthermore, the hardware installed in the management computer 3000 or the like such as the CPU, ROM and RAM can also be created by computer programs in order to exhibit the same functions as each of the configurations of the management computer 3000 described hereinabove. Moreover, a storage medium on which these computer programs are stored can also be provided.

INDUSTRIAL APPLICABILITY

The present invention can be applied to a management computer which enables optimization of the configuration of volumes provided by the plurality of storage apparatuses with an external connection function in order to be able to reduce the management man-hours involved in the volume configuration by the system administrator.

REFERENCE SIGNS LIST

100 Data network
200 Management network
1000 Storage apparatus
1300 Controller
1310 Control device 1400 Main memory
1410 Capacity information management program
1420 Performance information management program
1430 Configuration modification program
1440 Thin Provisioning management program
1450 External connection management program
1500 Storage device
1510 Physical disk
1530 Logical volume
2000 Host computer
2010 Control device
2300 Main memory
2310 Application program
2320 Path management program
3000 Management computer
3010 Control device
3300 Main memory
3310 External connection level count configuration program
3320 External connection level count modification program
3330 Permissible level count configuration program
3400, 4400 External connection level count management program
3500 Permissible level count management program
3600 Real volume unused capacity management program

The invention claimed is:

1. A management computer which is mutually connected, via a network, to a plurality of storage apparatuses including a real volume, and a host computer which requests writing of data to the plurality of storage apparatuses, wherein, by associating a virtual volume provided to the host computer with a real volume of an other storage apparatus other than the plurality of storage apparatuses, the plurality of storage apparatuses manage the real volume of the other storage apparatus as the real volume of the plurality of storage apparatuses, the management computer comprising:
a detection unit configured to detect a correspondence relationship between a virtual volume of one storage apparatus among the plurality of storage apparatuses and a real volume of the one storage apparatus or of the other storage apparatus; and
a modification unit which, if the real volume is added to any of the plurality of the storage apparatuses, is configured to modify the correspondence relationship between the virtual volume and the real volume associated with the virtual volume, according to the correspondence relationship detected by the detection unit;
wherein the detection unit is configured to detect, from the virtual volume of the one storage apparatus, a number of storage apparatuses up to and including the real volume of other storage apparatuses associated with the virtual volume.

2. The management computer according to claim 1,
wherein the detection unit is further configured to detect whether the virtual volume of one storage apparatus among the plurality of the storage apparatuses is associated with the real volume of any of the other storage apparatuses other than the one storage apparatus.

3. The management computer according to claim 1, further comprising:
a configuration unit configured to configure, in a volume configuration management table, a correspondence relationship between the virtual volume and the real volume of the storage apparatus detected by the detection unit.

4. The management computer according to claim 1,
wherein the detection unit is further configured to detect performance of storage tiers of the virtual volume and the real volume, and
wherein the modification unit, if the real volume is added to any of the plurality of storage apparatuses, is further configured to modify, as a priority, the correspondence relationship between the virtual volume and the real volume for which the performance of a storage tier of the virtual volume is high, among the virtual volumes according to a storage tier of the added real volume.

5. The management computer according to claim 1,
wherein if the real volume is added to any of the plurality of the storage apparatuses, the modification unit is further configured to migrate data of the virtual volume of the one storage apparatus to the real volume to modify the correspondence relationship between the virtual volume and the real volume.

6. The management computer according to claim 1,
wherein the configuration unit is configured to store in association with one another, apparatus numbers identifying the storage apparatuses, virtual volume numbers identifying the virtual volumes, numbers identifying real volumes associated with the virtual volumes, apparatus numbers identifying the storage apparatuses where the real volumes are stored, and a number of storage apparatuses from the virtual volumes to the real volumes.

7. The storage apparatus according to claim 1,
wherein, if the real volume is added to any of the plurality of storage apparatuses, correspondence relationships between the virtual volumes and the real volumes are modified to reduce a number of the externally connected storage apparatuses detected by the detection unit.

8. The management computer according to claim 1,
wherein the detection unit is further configured to detect, as a level count of the virtual volumes, a number of externally connected storage apparatuses, from the virtual volumes of the one storage apparatus up to and including the real volume of the other storage apparatuses associated with the virtual volumes.

9. The management computer according to claim 8,
wherein the configuration unit is further configured to store, in the volume configuration management table and in association with each other, apparatus numbers identifying the storage apparatuses, virtual volume numbers identifying the virtual volumes, numbers identifying real volumes associated with the virtual volumes, apparatus numbers identifying the storage apparatuses where the real volumes are stored, and level counts of the virtual volumes.

10. The storage apparatus according to claim 8,
wherein, if the real volume is added to any of the plurality of storage apparatuses, the correspondence relationship between the virtual volume and the real volume is modified to reduce the level count of the virtual volume detected by the detection unit.

11. A volume configuration management method which employs a management computer that is mutually connected, via a network, to a plurality of storage apparatuses with a real volume and a host computer which seeks the writing of data to the plurality of storage apparatuses, wherein, by associating a virtual volume which is provided to the host computer with a real volume of an other storage apparatus other than the plurality of storage apparatuses, the plurality of storage apparatuses manage the real volume of the other storage apparatus as the real volume of the plurality of storage apparatuses, the method comprising:

- detecting a correspondence relationship between a virtual volume of one storage apparatus of the plurality of storage apparatuses and a real volume of the one storage apparatus or the other storage apparatuses;
- modifying the correspondence relationship between the virtual volume and the real volume associated with the virtual volume according to a correspondence relationship detected by the detection unit, if the real volume is added to any of the plurality of storage apparatuses; and
- detecting, by the detection unit, from the virtual volume of the one storage apparatus, the number of storage apparatuses up to and including the real volume of other storage apparatuses associated with the virtual volume.

* * * * *